United States Patent
Masuda et al.

(10) Patent No.: US 11,650,315 B2
(45) Date of Patent: *May 16, 2023

(54) DISTANCE MEASUREMENT DEVICE, DISTANCE MEASUREMENT METHOD, AND DISTANCE MEASUREMENT PROGRAM

(71) Applicant: FUJIFILM CORPORATION, Tokyo (JP)

(72) Inventors: Tomonori Masuda, Saitama (JP); Hiroshi Tamayama, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/465,132

(22) Filed: Sep. 2, 2021

(65) Prior Publication Data
US 2021/0396875 A1 Dec. 23, 2021

Related U.S. Application Data

(63) Continuation of application No. 16/817,897, filed on Mar. 13, 2020, now Pat. No. 11,137,496, which is a (Continued)

(30) Foreign Application Priority Data

May 2, 2014 (JP) .................................. 2014-095557
Aug. 5, 2014 (JP) .................................. 2014-159803

(51) Int. Cl.
*H04N 5/235* (2006.01)
*H04N 5/232* (2006.01)
(Continued)

(52) U.S. Cl.
CPC ............... *G01S 17/08* (2013.01); *G01C 3/06* (2013.01); *G01S 7/484* (2013.01); *G01S 7/4876* (2013.01);
(Continued)

(58) Field of Classification Search
CPC ...... G02B 7/09; G02B 7/102; G02B 7/28–40; G03B 13/36; G01S 17/00–95; G01S 17/08–36; G01C 3/00–32
(Continued)

(56) References Cited

U.S. PATENT DOCUMENTS 7,738,082 B1 6/2010 Peters
11,137,496 B2 * 10/2021 Masuda ................ G01S 7/4876
(Continued)

FOREIGN PATENT DOCUMENTS

JP H09-133764 A 5/1997
JP H09-243747 A 9/1997
(Continued)

OTHER PUBLICATIONS

International Search Report issued in International Application No. PCT/JP2015/056876 dated Jun. 2, 2015.
(Continued)

*Primary Examiner* — Xi Wang
(74) *Attorney, Agent, or Firm* — SOLARIS Intellectual Property Group, PLLC

(57) ABSTRACT

A distance measurement device includes an imaging unit which captures a subject image formed by an imaging optical system forming the subject image indicating a subject, an emission unit which emits directional light as light having directivity along an optical axis direction of the imaging optical system, a light receiving unit which receives reflected light of directional light from the subject, a derivation unit which derives a distance to the subject based on a timing at which directional light is emitted by the emission unit and a timing at which reflected light is received by the light receiving unit, and a control unit which performs control such that at least a part of an imaging period by the imaging unit overlaps at least a part of a distance measure- (Continued)

DISTANCE MEASUREMENT DEVICE 10 ment period by the emission unit, the light receiving unit, and the derivation unit.

28 Claims, 15 Drawing Sheets

Related U.S. Application Data continuation of application No. 15/333,146, filed on Oct. 24, 2016, now Pat. No. 10,627,513, which is a continuation of application No. PCT/JP2015/056876, filed on Mar. 9, 2015.

(51) Int. Cl.
| | |
|---|---|
| G02B 7/40 | (2021.01) |
| G01S 17/08 | (2006.01) |
| G01C 3/06 | (2006.01) |
| G01S 17/10 | (2020.01) |
| G01S 17/88 | (2006.01) |
| G01S 7/484 | (2006.01) |
| G01S 7/487 | (2006.01) |
| H04N 5/238 | (2006.01) |

(52) U.S. Cl.
CPC .............. *G01S 17/10* (2013.01); *G01S 17/88* (2013.01); *G02B 7/40* (2013.01); *H04N 5/238* (2013.01); *H04N 5/2353* (2013.01); *H04N 5/232123* (2018.08); *H04N 5/232939* (2018.08)

(58) Field of Classification Search
USPC ............... 359/698; 348/345–357; 396/77, 78
See application file for complete search history.

(56) References Cited

U.S. PATENT DOCUMENTS

| | | | |
|---|---|---|---|
| 2003/0081137 A1 | 5/2003 | Yamazaki | |
| 2004/0090542 A1 | 5/2004 | Hirai et al. | |
| 2006/0125924 A1 | 6/2006 | Ing-Song et al. | |
| 2007/0071430 A1 | 3/2007 | Iwanaga | |
| 2007/0071431 A1 | 3/2007 | Inoue et al. | |
| 2007/0153112 A1 | 7/2007 | Ueda et al. | |
| 2008/0080851 A1 | 4/2008 | Endo | |
| 2008/0199046 A1* | 8/2008 | Sasagawa | H04N 13/144 382/106 |
| 2008/0237445 A1 | 10/2008 | Ikeno et al. | |
| 2010/0046802 A1 | 2/2010 | Watanabe et al. | |
| 2010/0118122 A1 | 5/2010 | Hartman | |
| 2012/0020516 A1* | 1/2012 | Lee | G06V 20/52 382/103 |
| 2012/0026294 A1* | 2/2012 | Rothenberger | G01S 7/4802 348/46 |
| 2012/0033957 A1 | 2/2012 | Itoh | |
| 2012/0050580 A1 | 3/2012 | Iwasaki | |
| 2012/0133787 A1 | 5/2012 | Yamaguchi | |
| 2013/0002882 A1 | 1/2013 | Onozawa et al. | |
| 2014/0320736 A1 | 10/2014 | Tomita et al. | |
| 2014/0347541 A1* | 11/2014 | Okazaki | H04P 5/23293 |
| 2016/0178734 A1 | 6/2016 | Kawamura et al. | |

FOREIGN PATENT DOCUMENTS

| | | |
|---|---|---|
| JP | 2002-207163 A | 7/2002 |
| JP | 2008-96181 A | 4/2008 |
| JP | 2008-219370 A | 9/2008 |
| JP | 2008-275331 A | 11/2008 |
| JP | 2011-27451 A | 2/2011 |
| JP | 2011-234871 A | 11/2011 |
| JP | 2012-114682 A | 6/2012 |
| JP | 2013-83510 A | 5/2013 |
| JP | 2013-207415 A | 10/2013 |
| JP | 2014-115191 A | 6/2014 |

OTHER PUBLICATIONS

Written Opinion of the ISA issued in International Application No. PCT/JP2015/056876 dated Jun. 2, 2015.
Written Opinion of the IPEA issued in International Application No. PCT/JP2015/056876 dated Feb. 9, 2016.
International Preliminary Report on Patentability issued in International Application No. PCT/JP2015/056876 dated Jun. 21, 2016.
Non-Final Office Action issued by USPTO dated Sep. 11, 2018, in related U.S. Appl. No. 15/333,146.
Final Office Action issued by USPTO dated Mar. 5, 2019, in related U.S. Appl. No. 15/333,146.
Non-Final Office Action issued by USPTO dated Jul. 16, 2019, in related U.S. Appl. No. 15/333,146.
Notice of Allowance issued by USPTO dated Dec. 18, 2019, in related U.S. Appl. No. 15/333,146.
English language translation of the following: Office action dated Jan. 21, 2021 from the DPMA in a German patent application No. 112015002098.5 corresponding to the instant patent application.
Non-Final Office Action issued by USPTO dated Feb. 9, 2021, in related U.S. Appl. No. 16/817,897.
Notice of Allowance issued by USPTO dated Jun. 11, 2021, in related U.S. Appl. No. 16/817,897.

* cited by examiner

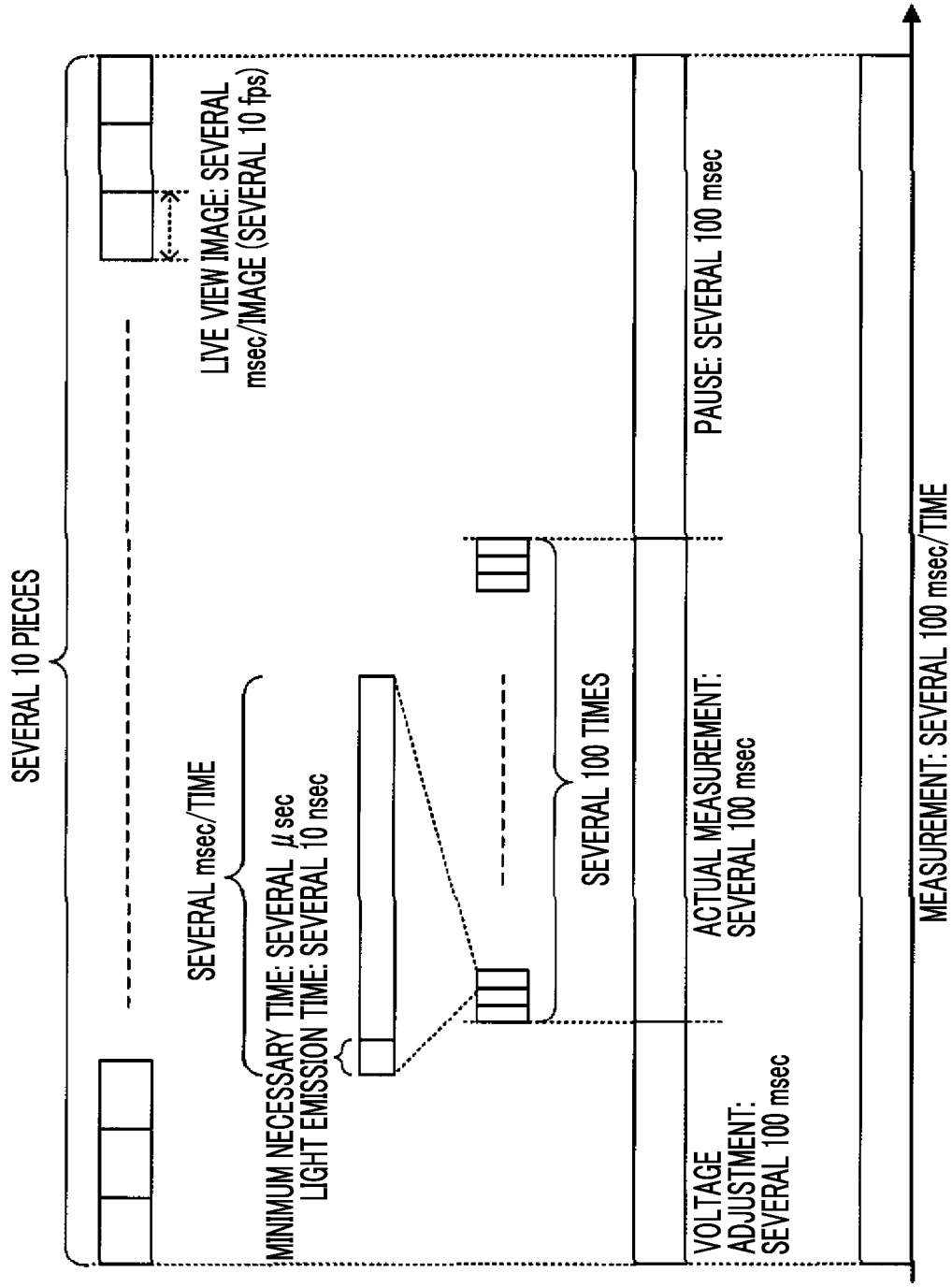

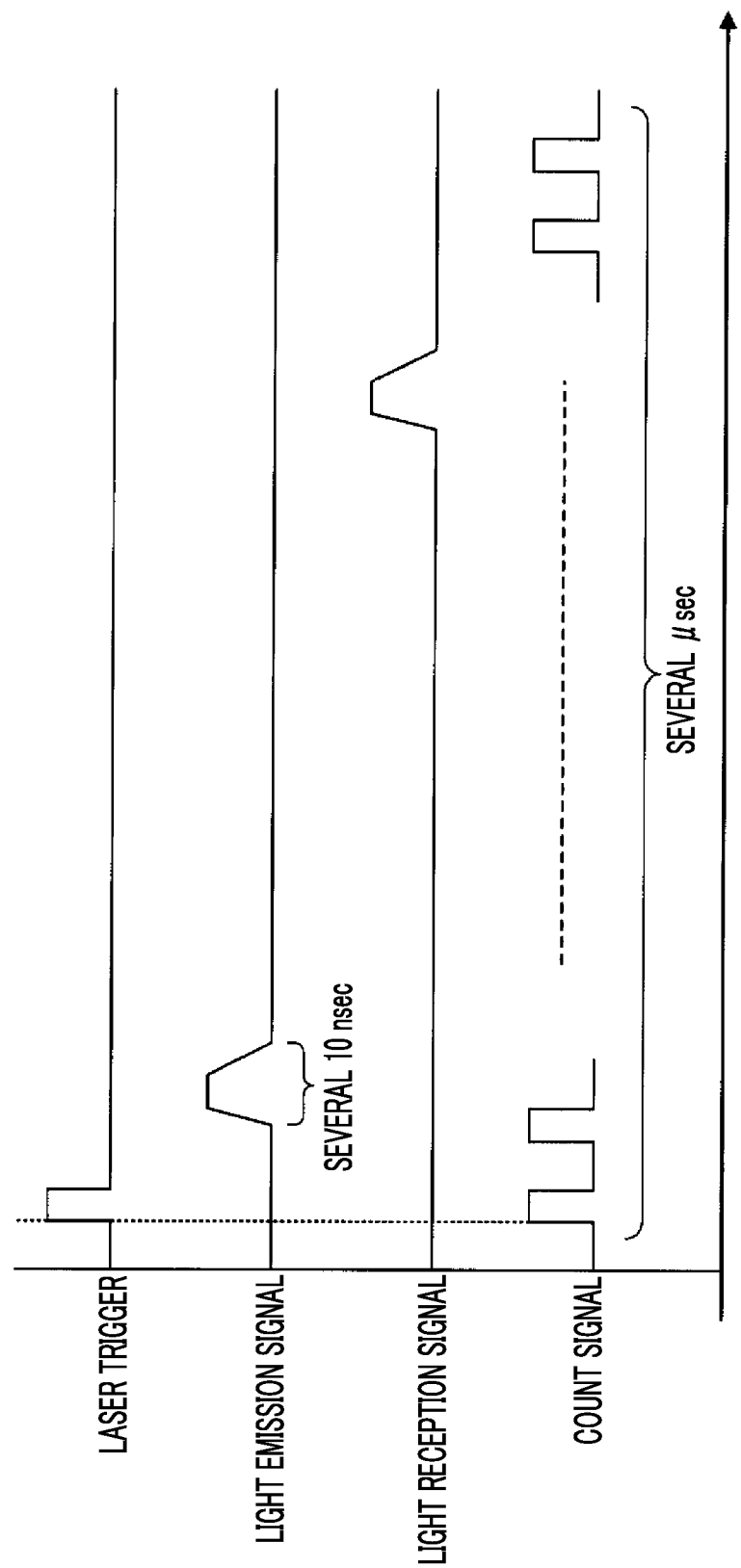

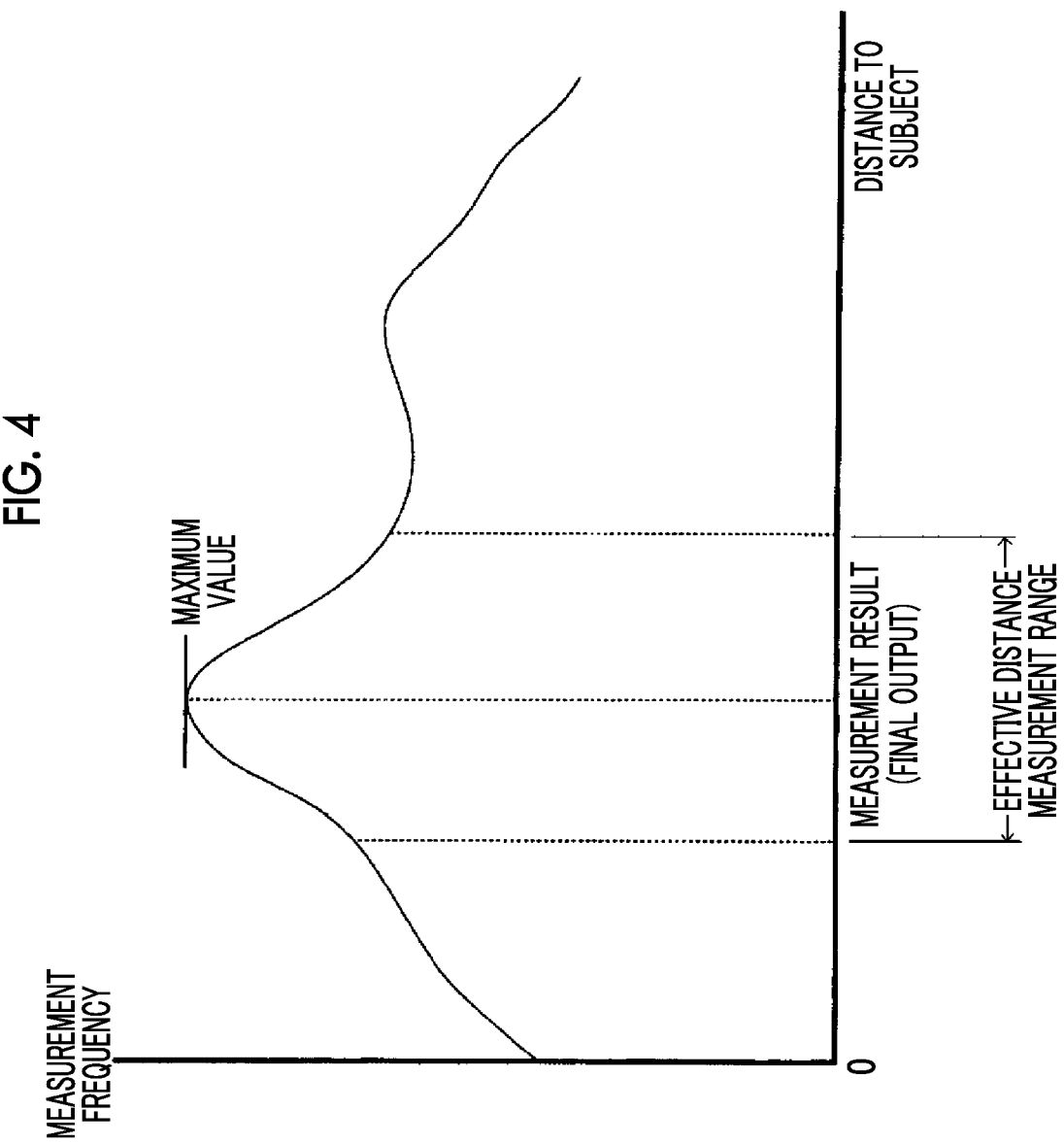

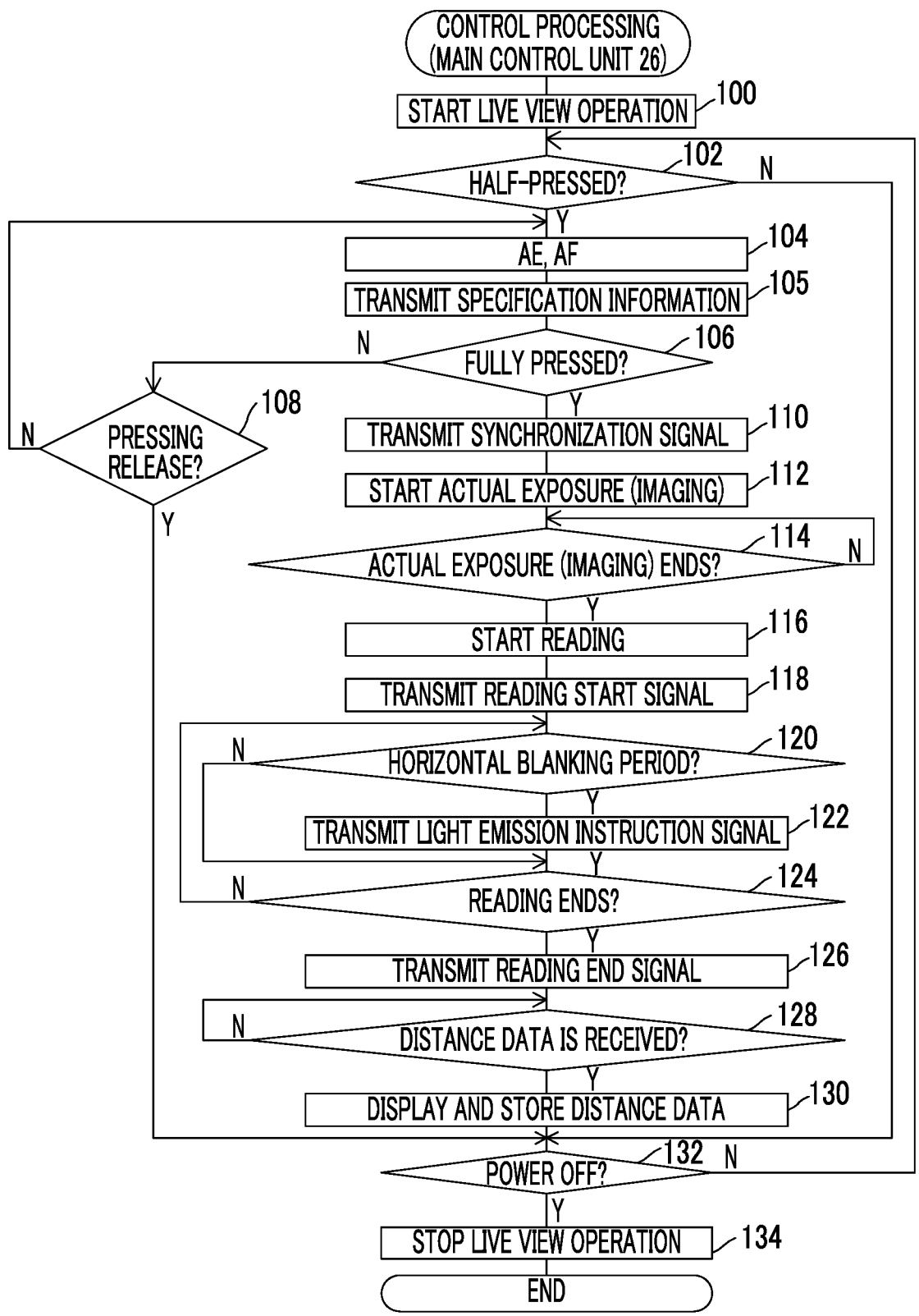

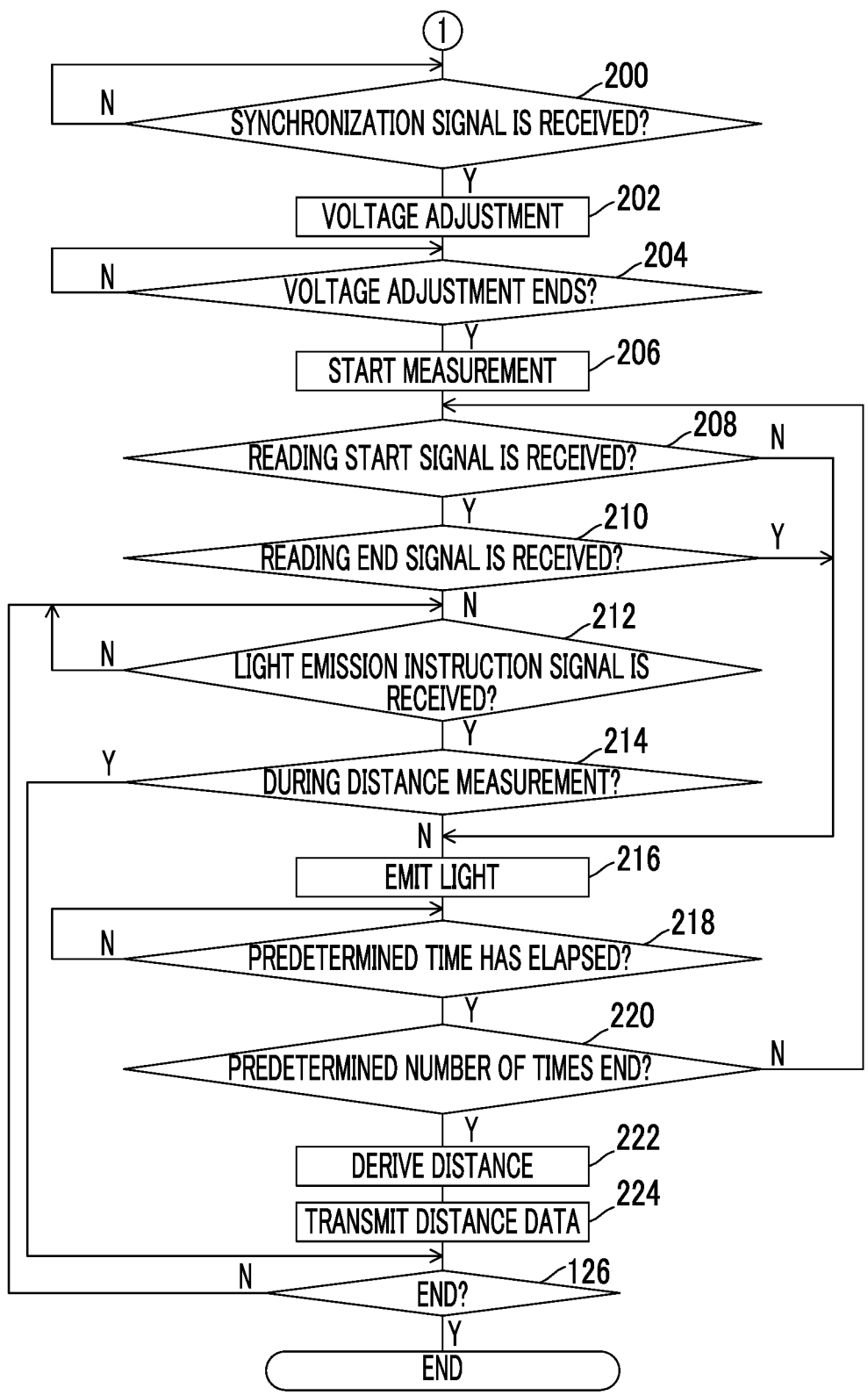

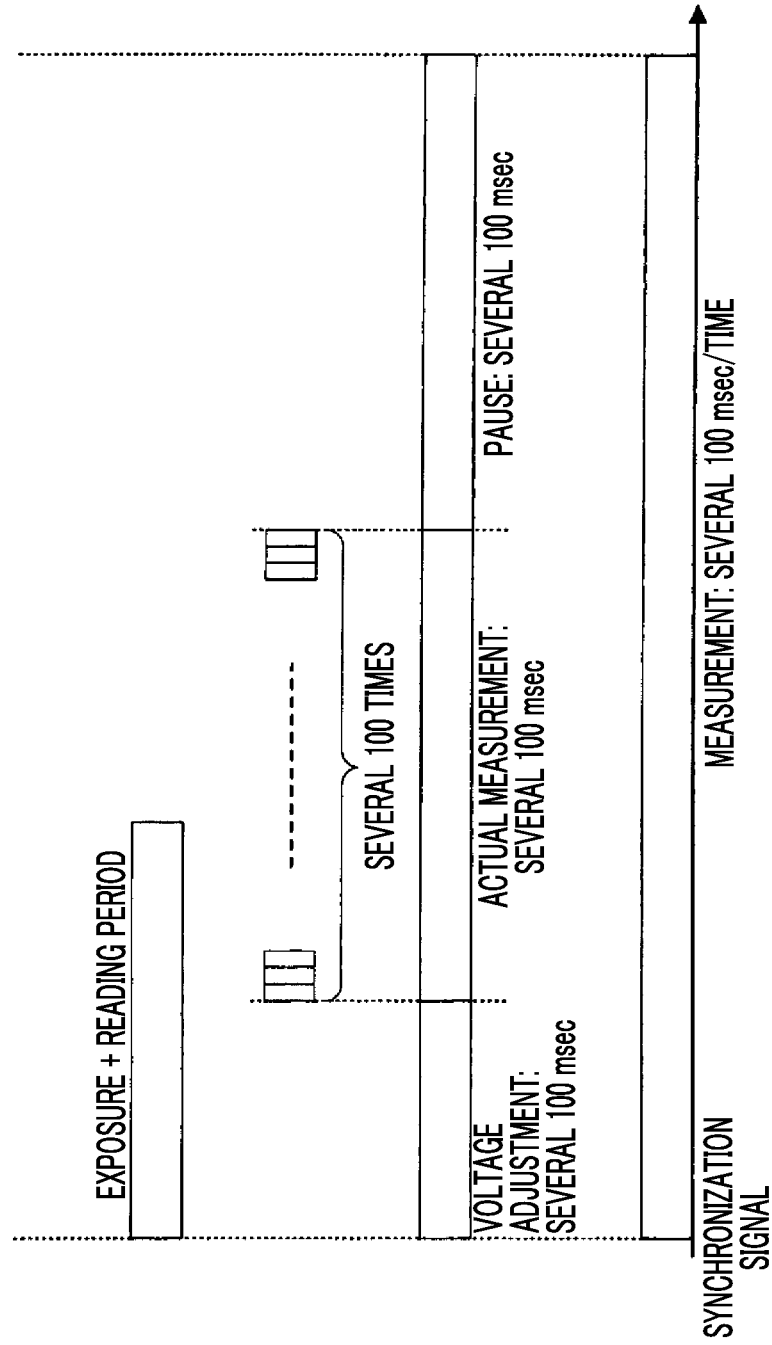

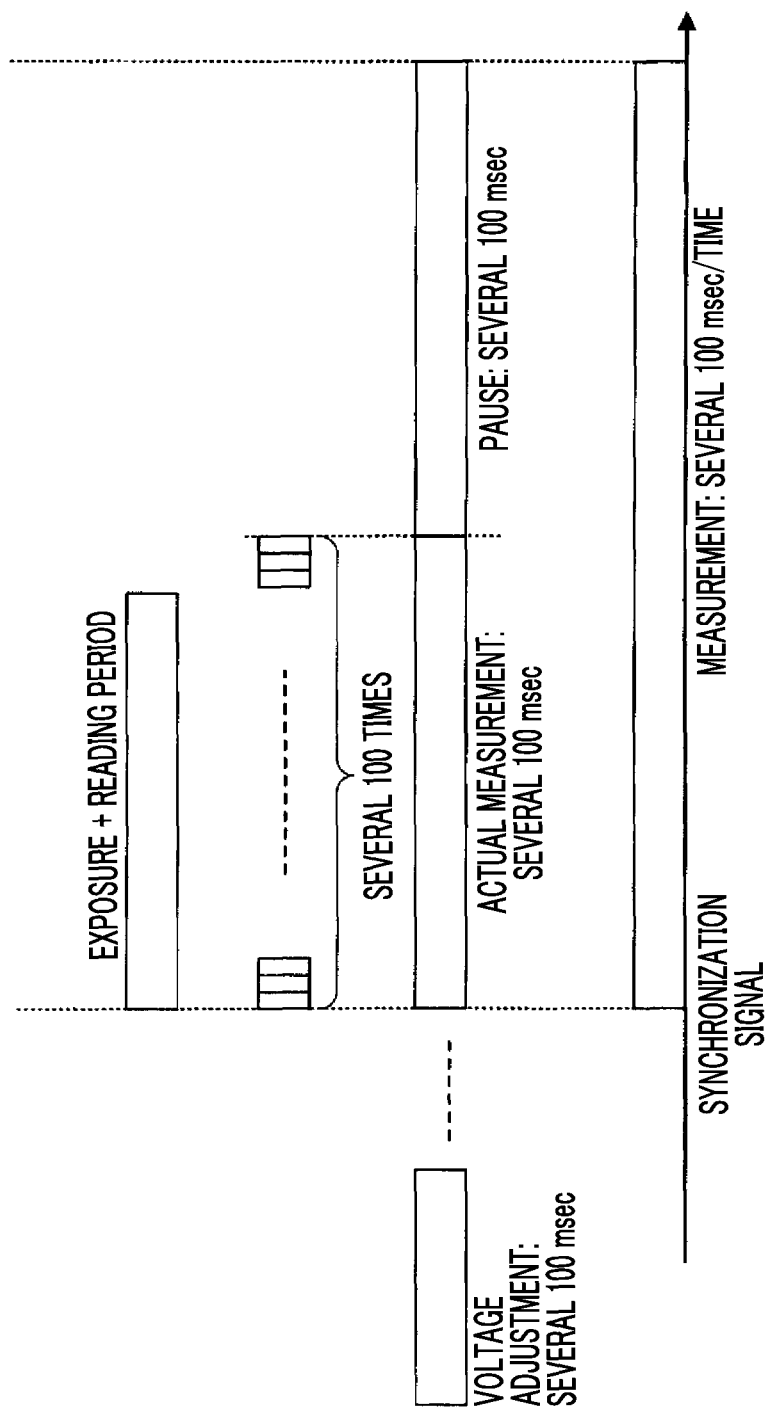

| SUBJECT BRIGHTNESS | LIGHT EMISSION FREQUENCY |
|---|---|
| $L_1$ | $N_1$ |
| $L_2$ | $N_2$ |
| ⋮ | ⋮ |
| $L_n$ | $N_n$ | table 300

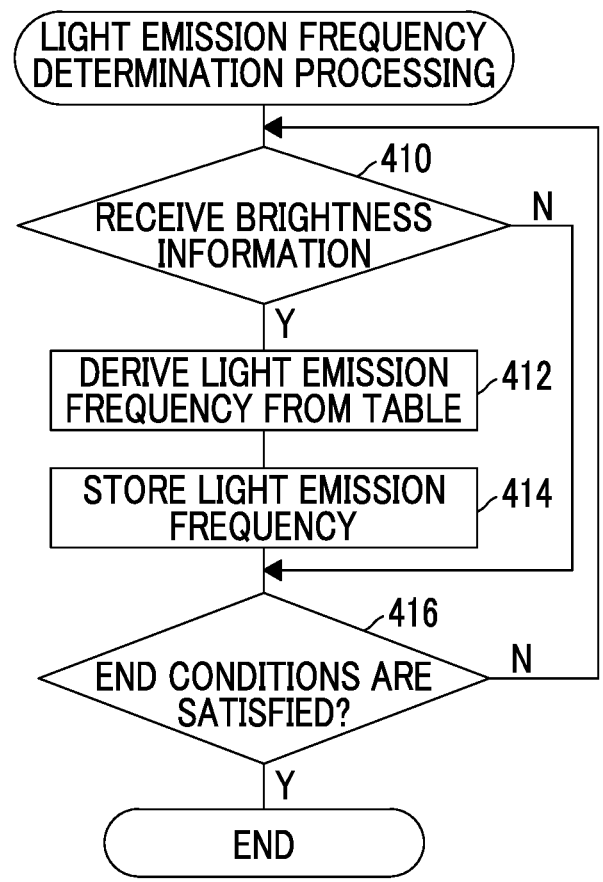

DISTANCE MEASUREMENT DEVICE, DISTANCE MEASUREMENT METHOD, AND DISTANCE MEASUREMENT PROGRAM

CROSS-REFERENCE TO RELATED APPLICATIONS

This application is a continuation application of, and claims priority to, U.S. patent application Ser. No. 16/817,897, filed Mar. 13, 2020, which is a continuation application of, and claims priority to, U.S. patent application Ser. No. 15/333,146, filed Oct. 24, 2016, which is a continuation application of International Application No. PCT/JP2015/056876, filed Mar. 9, 2015. Further, this application claims priority from Japanese Patent Application No. 2014-095557, filed May 2, 2014, and Japanese Patent Application No. 2014-159803, filed Aug. 5, 2014. The disclosures of all the applications listed above are incorporated herein by reference in their entireties.

BACKGROUND

1. Technical Field

A technique of the present disclosure relates to a distance measurement device, a distance measurement method, and a distance measurement program.

2. Related Art

JP2008-96181A discloses a device including time detection means for detecting the time from the emission of measurement light to the reception of measurement light by light receiving means, shake amount detection means for detecting a shake amount of a housing during emission of measurement light when measurement light is emitted from light emitting means, and distance determination means for determining the distance to an object to be measured based on the time detected by the time detection means and the shake amount detected by the shake amount detection means.

JP2002-207163A discloses a distance measurement and imaging device having a distance measurement function of measuring a distance to a subject by irradiating the subject with a laser beam along an optical axis of a lens and detecting reflected light of the laser beam and an imaging function of imaging the subject.

SUMMARY

However, in the above-described distance measurement and imaging device, since imaging is performed regardless of the distance measurement, it is difficult to efficiently perform imaging and the distance measurement.

An embodiment of the invention has been suggested in consideration of such a situation, and provides a distance measurement device, a distance measurement method, and a distance measurement program capable of efficiently executing imaging and a distance measurement.

In order to attain the above-described object, a distance measurement device according to a first aspect of the invention comprises an imaging optical system which forms a subject image indicating a subject, an imaging unit which captures the subject image formed by the imaging optical system, an emission unit which emits directional light as light having directivity along an optical axis direction of the imaging optical system, a light receiving unit which receives reflected light of the directional light from the subject, a derivation unit which derives a distance to the subject based on a timing at which the directional light is emitted by the emission unit and a timing at which the reflected light is received by the light receiving unit, and a control unit which performs control such that at least a part of an imaging period by the imaging unit overlaps at least a part of a distance measurement period by the emission unit, the light receiving unit, and the derivation unit. With this, the distance measurement device according to the first aspect of the invention can efficiently execute imaging and a distance measurement compared to a case where an imaging period and a distance measurement period do not overlap each other.

According to a second aspect of the invention, in the distance measurement device according to the first aspect of the invention, the control unit may perform control such that the imaging start timing by the imaging unit and the distance measurement start timing by the emission unit, the light receiving unit, and the derivation unit are synchronized with each other. With this, the distance measurement device according to the second aspect of the invention can efficiently execute imaging and a distance measurement compared to a case where a distance measurement is started at a timing later than a timing at which imaging is started.

According to a third aspect of the invention, in the distance measurement device according to the second aspect of the invention, the imaging start timing may be a timing at which actual exposure by the imaging unit is started. With this, the distance measurement device according to the third aspect of the invention can efficiently execute imaging and a distance measurement compared to a case where a distance measurement is started at a timing later than the timing at which actual exposure is started.

According to a fourth aspect of the invention, in the distance measurement device according to the first aspect of the invention, the control unit may perform control such that the timing at which the actual exposure by the imaging unit ends and the distance measurement start timing by the derivation unit are synchronized with each other. With this, the distance measurement device according to the fourth aspect of the invention can efficiently execute imaging and a distance measurement compared to a case where a distance measurement is started at a timing later than a timing at which actual exposure ends.

According to a fifth aspect of the invention, in the distance measurement device according to the first aspect of the invention, the control unit may perform control such that the reading end timing of signal charges according to the actual exposure by the imaging unit and the distance measurement start timing by the emission unit, the light receiving unit, and the derivation unit are synchronized with each other. The distance measurement device according to the fifth aspect of the invention can efficiently execute imaging and a distance measurement compared to a case where a distance measurement is started at the timing later than the reading end timing of the signal charges.

According to a sixth aspect of the invention, in the distance measurement device according to any one of the first to fifth aspects of the invention, the derivation unit may perform the derivation of the distance multiple times and may derive a distance having a high frequency among the distances obtained by deriving the distance multiple times as a final distance. With this, the distance measurement device according to the sixth aspect of the invention can derive a distance highly necessary for the user as a final distance compared to a case where the distance having a high frequency among the distances obtained by performing the derivation of the distance to the subject multiple times is not output.

According to a seventh aspect of the invention, in the distance measurement device according to the sixth aspect of the invention, in a case of deriving the distance, the derivation unit may determine a distance range for use when determining the frequency or a time range from the emission of the directional light to the reception of the directional light based on focusing state specification information and may derive the final distance within the determined distance range or the determined time range. With this, the distance measurement device according to the seventh aspect of the invention can derive a distance within a distance range focused by the user as a final distance compared to a case where the distance to the subject is not derived based on a distance range or a time range determined based on an adjustment result.

According to an eighth aspect of the invention, in the distance measurement device according to the seventh aspect of the invention, in a case of deriving the distance, the derivation unit may derive the final distance with a resolution determined according to a result of determination of the distance range or the time range. With this, the distance measurement device according to the eighth aspect of the invention can minutely derive a final distance compared to a case where the distance to the subject is derived without using the resolution determined according to a result of determination of a distance range or a time range.

According to a ninth aspect of the invention, in the distance measurement device according to any one of the first to eighth aspects of the invention, the emission unit may be able to adjust the emission intensity of the directional light and may adjust the emission intensity based on at least one of focusing state specification information or subject brightness or exposure state specification information to emit the directional light. With this, the distance measurement device according to the ninth aspect of the invention can suppress the emission of directional light by the emission unit in a state where the emission intensity is excessive and deficient compared to a case where the emission intensity of directional light is adjusted without using any of focusing state specification information, subject brightness, and exposure state specification information.

According to a tenth aspect of the invention, in the distance measurement device according to the ninth aspect of the invention, the emission unit may make the emission intensity lower when a focal distance indicated by the focusing state specification information is shorter. With this, the distance measurement device according to the tenth aspect of the invention can suppress the emission of directional light by the emission unit in a state where the emission intensity is excessive and deficient compared to a case where a configuration in which the shorter the focal distance, the lower the emission intensity is not provided.

According to an eleventh aspect of the invention, in the distance measurement device according to the ninth or tenth aspect of the invention, the emission unit may make the emission intensity lower when the subject brightness is lower and may make the emission intensity lower when the exposure indicated by the exposure state specification information is higher. With this, the distance measurement device according to the eleventh aspect of the invention can suppress the emission of directional light by the emission unit in a state where the emission intensity is excessive and deficient compared to a case where a configuration in which the higher the exposure, the lower the emission intensity is not provided.

According to a twelfth aspect of the invention, in the distance measurement device according to any one of the first to eleventh aspects of the invention, the light receiving unit may be able to adjust light receiving sensitivity and may adjust the light receiving sensitivity based on focusing state specification information to receive the reflected light. With this, the distance measurement device according to the twelfth aspect of the invention can suppress the reception of reflected light by the light receiving unit in a state where the light receiving sensitivity is excessive and deficient compared to a case where the light receiving sensitivity of the light receiving unit is adjusted without using focusing state specification information.

According to a thirteenth aspect of the invention, in the distance measurement device according to the twelfth aspect of the invention, the light receiving unit may make the light receiving sensitivity lower when a focal distance indicated by the focusing state specification information is shorter. With this, the distance measurement device according to the thirteenth aspect of the invention can suppress the reception of reflected light by the light receiving unit in a state where the light receiving sensitivity is excessive and deficient compared to a case where a configuration in which the shorter the focal distance obtained as a result of focus adjustment, the lower the light receiving sensitivity is not provided.

According to a fourteenth aspect of the invention, the distance measurement device according to any one of the first to thirteenth aspects of the invention may further comprise a display unit which displays an image, and the control unit may perform control such that the display unit displays a motion image captured by the imaging unit and displays information relating to the distance to the subject derived by the derivation unit. With this, the distance measurement device according to the fourteenth aspect of the invention can make the user accurately ascertain the relationship between the state of the subject and the distance to the subject compared to a case where information relating to the distance to the subject is not displayed in parallel with the display of a motion image.

According to a fifteenth aspect of the invention, in the distance measurement device according to any one of the first to fourteenth aspects of the invention, a distance measurement by the emission unit, the light receiving unit, and the derivation unit may be performed a number of times determined in advance according to subject brightness or exposure state specification information. With this, the distance measurement device according to the fifteenth aspect of the invention can obtain a distance measurement result, in which the influence of noise of ambient light is moderated, compared to a case where the light emission frequency of directional light is fixed regardless of subject brightness.

According to a sixteenth aspect of the invention, in the distance measurement device according to the fifteenth aspect of the invention, a distance measurement by the emission unit, the light receiving unit, and the derivation unit may be performed a larger number of times when the subject brightness is higher or when the exposure indicated by the exposure state specification information is lower. With this, the distance measurement device according to the sixteenth aspect of the invention can obtain a distance measurement result, in which the influence of noise of ambient light is moderated, compared to a case where the light emission frequency of directional light is fixed regardless of high subject brightness.

According to a seventeenth aspect of the invention, the distance measurement device according to any one of the first to sixteenth aspects of the invention may further comprise a storage unit which stores the distance derived by the derivation unit, and the storage by the storage unit may be stopped in a case where the derivation of the distance by the derivation unit is impossible. With this, the distance measurement device according to the seventeenth aspect of the invention can prevent storage of incomplete distance data.

According to an eighteenth aspect of the invention, the distance measurement device according to the seventeenth aspect of the invention may further comprise a storage setting unit which sets whether or not to stop storage by the storage unit in a case where the derivation of the distance by the derivation unit is impossible. With this, the distance measurement device according to the eighteenth aspect of the invention can set whether or not to perform storage into the storage unit according to a user's intention in a case where the derivation of the distance is impossible.

According to a nineteenth aspect of the invention, in the distance measurement device according to any one of the first to eighteenth aspects of the invention, the derivation unit may derive the distance in a case where there is no focus adjustment error by a focus adjustment unit performing focus adjustment of the imaging optical system with respect to the subject and there is no exposure adjustment error by an exposure adjustment unit adjusting exposure in a case where the imaging unit performs imaging. With this, the distance measurement device according to the nineteenth aspect of the invention can obtain a distance measurement result along with an image subjected to focusing and exposure adjustment.

In order to attain the above-described object, a distance measurement method according to a twentieth aspect of the invention comprises deriving a distance to a subject based on a timing at which directional light is emitted by an emission unit emitting directional light as light having directivity along an optical axis direction of an imaging optical system forming a subject image indicating the subject and a timing at which reflected light is received by a light receiving unit receiving the reflected light of the directional light from the subject, and performing control such that at least a part of an imaging period by an imaging unit capturing a subject image formed by the imaging optical system overlaps at least a part of a distance measurement period. With this, the distance measurement method according to the twentieth aspect of the invention can efficiently execute imaging and a distance measurement compared to a case where an imaging period and a distance measurement period do not overlap each other.

In order to attain the above-described object, a distance measurement program according to a twenty-first aspect of the invention causes a computer to execute processing comprising deriving a distance to a subject based on a timing at which directional light is emitted by an emission unit emitting directional light as light having directivity along an optical axis direction of an imaging optical system forming a subject image indicating the subject and a timing at which reflected light is received by a light receiving unit receiving the reflected light of the directional light from the subject, and performing control such that at least a part of an imaging period by an imaging unit capturing a subject image formed by the imaging optical system overlaps at least a part of a distance measurement period. With this, the distance measurement program according to the twenty-first aspect of the invention can efficiently execute imaging and a distance measurement compared to a case where an imaging period and a distance measurement period do not overlap each other.

According to an embodiment of the invention, it is possible to efficiently execute imaging and a distance measurement compared to a case where an imaging period and a distance measurement period do not overlap each other.

BRIEF DESCRIPTION OF THE DRAWINGS

Exemplary embodiments according to the technique of the present disclosure will be described in detail based on the following figures, wherein:

FIG. 2 is a timing chart showing an example of a timing of a distance measurement operation to measure a distance to a subject in the distance measurement device according to the embodiment;

FIG. 3 is a timing chart showing an example of a timing from light emission to light reception in a single measurement in the distance measurement device of the embodiment;

FIG. 4 is a graph showing an example of a histogram of measured values in a case where a distance to a subject is set as a horizontal axis and a measurement frequency is set as a vertical axis;

FIG. 5 is a flowchart showing an example of a flow of control processing which is executed by a main control unit of the distance measurement device according to the embodiment;

FIG. 6B is a continuation of the flowchart shown in FIG. 6A;

FIG. 7 is an example of a timing chart showing the timings of an imaging operation and a distance measurement operation in the distance measurement device according to the embodiment;

FIG. 8 is an example of a timing chart showing a modification example of the timings of an imaging operation and a distance measurement operation in the distance measurement device according to the embodiment;

FIG. 13 is a flowchart showing an example of a flow of light emission frequency determination processing.

FIG. 14 is a conceptual diagram showing another example of the configuration of a light emission frequency determination table.

DETAILED DESCRIPTION

Hereinafter, an example of an embodiment of a distance measurement device according to the technique of the present disclosure will be described referring to the accompanying drawings. In this embodiment, a "distance measurement" indicates a measurement of a distance to a subject to be a measurement target. In this embodiment, the magnitude of exposure has the same meaning as the level of exposure.

Figure 1:
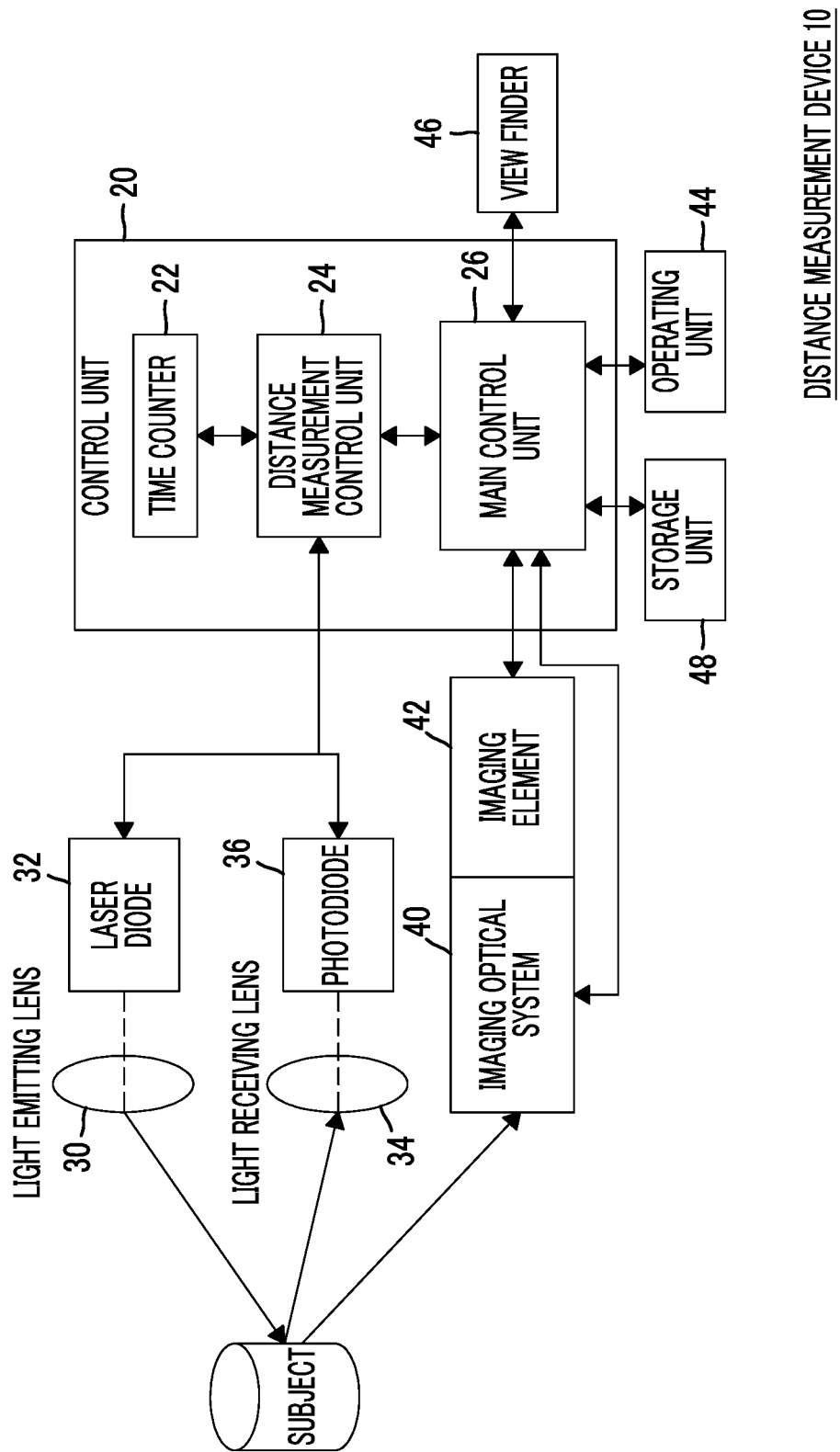
FIG. 1 is a block diagram showing an example of the configuration of a main part of a distance measurement device according to an embodiment.

First, the configuration of the distance measurement device according to this embodiment will be described. FIG. 1 is a block diagram showing the configuration of a main part of a distance measurement device 10 according to this embodiment.

The distance measurement device 10 of this embodiment has a function of performing a distance measurement and a function of imaging a subject to generate a captured image indicating the subject. The distance measurement device 10 of this embodiment comprises a control unit 20, a light emitting lens 30, a laser diode 32, a light receiving lens 34, a photodiode 36, an imaging optical system 40, an imaging element 42, an operating unit 44, a view finder 46, and a storage unit 48.

The control unit 20 comprises a time counter 22, a distance measurement control unit 24, and a main control unit 26. The time counter 22 has a function of generating a count signal in each given period determined in advance according to a signal (for example, a clock pulse) input from the main control unit 26 through the distance measurement control unit 24.

The distance measurement control unit 24 has a function of performing a distance measurement under the control of the main control unit 26. The distance measurement control unit 24 of this embodiment controls the driving of the laser diode 32 at a timing according to the count signal generated by the time counter 22 to perform the distance measurement. The distance measurement control unit 24 functions as a derivation unit according to the technique of the present disclosure. Specific examples of the distance measurement control unit 24 include an application specific integrated circuit (ASIC), a field-programmable gate array (FPGA), and the like. The distance measurement control unit 24 of this embodiment has a storage unit (not shown). Specific examples of the storage unit in the distance measurement control unit 24 include a nonvolatile storage unit, such as a read only memory (ROM), and a volatile storage unit, such as a random access memory (RAM).

The main control unit 26 has a function of controlling the entire distance measurement device 10. The main control unit 26 of this embodiment has a function of controlling the imaging optical system 40 and the imaging element 42 to image a subject and generating a captured image (subject image). The main control unit 26 functions as a control unit, a brightness detection unit, a focus adjustment unit, and an exposure adjustment unit according to the technique of the present disclosure. Specific examples of the main control unit 26 include a central processing unit (CPU) and the like. The distance measurement control unit 24 of this embodiment has a storage unit (not shown). Specific examples of the storage unit in the distance measurement control unit 24 include a nonvolatile storage unit, such as a ROM, and a volatile storage unit, such as a RAM. A program of control processing described below is stored in the ROM in advance.

A program of control processing is not necessarily stored in the main control unit 26 from the beginning. For example, a control program may be stored in advance in an arbitrary portable storage medium, such as a solid state drive (SSD), a CD-ROM, a DVD disk, a magneto-optical disk, or an IC card. The distance measurement device 10 may acquire the control program from the portable storage medium storing the program and may store the control program in the main control unit 26 or the like. Furthermore, the distance measurement device 10 may acquire the control program from other external devices through the Internet or a local area network (LAN) and may store the control program in the main control unit 26 or the like.

The operating unit 44 is a user interface which is operated by the user when various instructions are provided to the distance measurement device 10. The operating unit 44 includes a release button, a distance measurement instruction button, and buttons, keys, or the like (all of these are not shown) which are used when the user provides various instructions. Various instructions received by the operating unit 44 are output to the main control unit 26 as operation signals, and the main control unit 26 executes processing according to the operation signals input from the operating unit 44.

The release button of the operating unit 44 detects a two-stage pressing operation of an imaging preparation instruction state and an imaging instruction state. The imaging preparation instruction state indicates, for example, a state of being pressed from a standby position to an intermediate position (half-pressing position), and the imaging instruction state indicates a state of being pressed to a final pressing position (fully pressing position) beyond the intermediate position. Hereinafter, "the state of being pressed from the standby position to the half-pressing position" refers to a "half-pressing state", and "the state of being pressed from the standby position or the half-pressing position to the fully pressing position" refers to a "fully pressing state".

In the distance measurement device 10 according to this embodiment, a manual focus mode and an auto-focus mode are selectively set according to a user's instruction. In the auto-focus mode, adjustment of imaging conditions is performed by bringing the release button of the operating unit 44 into the half-pressing state, and then, exposure (imaging) is performed by successively bringing the release button into the fully pressing state. That is, if the release button of the operating unit 44 is brought into the half-pressing state, an automatic exposure (AE) function is operated to perform exposure adjustment, and an auto-focus (AF) function is operated to perform focusing control, and if the release button is brought into the fully pressing state, imaging is performed.

The storage unit 48 primarily stores image data obtained by imaging, and a nonvolatile memory is used therefor. Specific examples of the storage unit 48 include a flash memory or a hard disk drive (HDD).

The view finder 46 has a function of displaying images, character information, and the like. The view finder 46 of this embodiment is an electronic view finder (hereinafter, referred to as "EVF"), and is used for displaying a live view image (through-image) as an example of a continuous-frame image obtained by imaging in continuous frames during imaging. The view finder 46 is also used for displaying a still image as an image of a single-frame image obtained by imaging in a single frame in a case where an instruction to capture a still image is provided. In addition, the view finder 46 is also used for displaying a reproduced image in a playback mode or displaying a menu screen or the like.

The imaging optical system 40 comprises an imaging lens including a focus lens, a motor, a slide mechanism, and a shutter (all of these are not shown). The slide mechanism moves the focus lens along the optical axis direction (not shown) of the imaging optical system 40. The focus lens is attached so as to be slidable along the optical axis direction of the slide mechanism. The motor is connected to the slide mechanism, and the slide mechanism receives power of the motor and slides the focus lens along the optical axis direction. The motor is connected to the main control unit 26 of the control unit 20, and is controlled and driven according to a command from the main control unit 26. In the distance measurement device 10 of this embodiment, as a specific example of the motor, a stepping motor is applied. Accordingly, the motor is operated in synchronization with pulse power in response to a command from the main control unit 26.

In the distance measurement device 10 according to this embodiment, in the auto-focus mode, the main control unit 26 performs focusing control by driving and controlling the motor of the imaging optical system 40 such that a contrast value of an image obtained by imaging with the imaging element 42 becomes the maximum. Furthermore, in the auto-focus mode, the main control unit 26 calculates AE information which is a physical quantity indicating brightness of an image obtained by imaging. The main control unit 26 derives a shutter speed and an F-number according to the brightness of the image indicated by the AE information when the release button of the operating unit 44 is brought into the half-pressing state. The main control unit 26 performs exposure adjustment by controlling respective related units such that the derived shutter speed and F-number (aperture value) are obtained.

The imaging element 42 is an imaging element comprising color filters (not shown), and functions as an imaging unit according to the technique of the present disclosure. In this embodiment, as an example of the imaging element 42, a CMOS type image sensor is used. The imaging element 42 is not limited to a CMOS type image sensor, and may by, for example, a CCD image sensor. The color filters include a G filter corresponding green (G) most contributing to obtaining a brightness signal, an R filter corresponding to red (R), and a B filter corresponding to blue (B). Any filter of "R", "G", and "B" included in the color filters is allocated to each of the pixels (not shown) of the imaging element 42.

In a case of imaging a subject, image light indicating the subject is formed on the light receiving surface of the imaging element 42 through the imaging optical system 40. The imaging element 42 has a plurality of pixels (not shown) arranged in a matrix in a horizontal direction and a vertical direction, and signal charges according to image light are stored in the pixels of the imaging element 42. The signal charges stored in the pixels of the imaging element 42 are sequentially read as digital signals according to the signal charges (voltages) under the control of the main control unit 26.

In the distance measurement device 10 according to this embodiment, the signal charges are sequentially read in units of pixels for each horizontal direction, that is, for each pixel row. In a period from when the electric charges are read from the pixels of one pixel row until the electric charges are read from the pixels of the next pixel row, a period (hereinafter, referred to as a "horizontal blanking period") during which the signal charges are not read is generated.

The imaging element 42 has a so-called electronic shutter function, and operates the electronic shutter function to control an electric charge storage time (shutter speed) of each photosensor at a timing under the control of the main control unit 26.

The imaging element 42 outputs the digital signals indicating the pixel values of the captured image from the respective pixels. The captured image output from the respective pixels is a chromatic image, and is, for example, a color image having the same color arrangement as the pixel arrangement. The captured image (frames) output from the imaging element 42 is temporarily stored (overwritten and saved) in the storage unit of the main control unit 26 or a RAW image storage area (not shown) of the storage unit 48 determined in advance through the main control unit 26.

The main control unit 26 subjects the frames to various kinds of image processing. The main control unit 26 has a white balance (WB) gain unit, a gamma correction unit, and a synchronization processing unit (all of these are not shown), and sequentially performs signal processing for the original digital signals (RAW images) temporarily stored in the main control unit 26 or the like in each processing unit. That is, the WB gain unit executes white balance (WB) adjustment by adjusting the gain of each of R, G, and B signals. The gamma correction unit performs gamma correction of each of the R, G, and B signals subjected to the WB adjustment in the WB gain unit. The synchronization processing unit performs color interpolation processing corresponding to the arrangement of the color filters of the imaging element 42 and generates the synchronized R, G, and B signals. Each time the RAW image for one screen is acquired by the imaging element 42, the main control unit 26 performs image processing for the RAW image in parallel.

The main control unit 26 outputs image data of the generated captured image for recording to an encoder (not shown), which converts an input signal to a signal in a different format. The R, G, and B signals processed by the main control unit 26 are converted (encoded) to signals for recording by the encoder, and the signals for recording are recorded in the storage unit 48. The captured image for display processed by the main control unit 26 is output to the view finder 46. Hereinafter, for convenience of description, in a case where there is no need for distinction between the "captured image for recording" and the "captured image for display", the expression "for recording" and the expression "for display" are omitted and the captured image for recording and the captured image for display are referred to as "captured images".

The main control unit 26 of this embodiment displays a live view image on the view finder 46 by performing control for continuously displaying the captured images for display as a motion image.

The light emitting lens 30 and the laser diode 32 function as an example of an emission unit according to the technique of the present disclosure. The laser diode 32 is driven based on an instruction from the distance measurement control unit 24 and has a function of emitting a laser beam toward the subject to be a measurement target through the light emitting lens 30 in the optical axis direction of the imaging optical system 40. Specific examples of the light emitting lens 30 of this embodiment include an objective lens or the like. The laser beam emitted from the laser diode 32 is an example of directional light according to the technique of the present disclosure.

The light receiving lens 34 and the photodiode 36 function as an example of a light receiving unit according to the technique of the present disclosure. The photodiode 36 has a function of receiving the laser beam emitted from the laser diode 32 and reflected from the subject through the light receiving lens 34 and outputting an electrical signal according to the amount of received light to the distance measurement control unit 24.

If the user provides an instruction to measure a distance using the distance measurement instruction button or the like of the operating unit 44, the main control unit 26 instructs the distance measurement control unit 24 to perform a distance measurement. Specifically, in this embodiment, the main control unit 26 instructs the distance measurement control unit 24 to perform a distance measurement by transmitting a distance measurement instruction signal to the distance measurement control unit 24. In a case of performing a measurement of a distance to a subject and imaging of the subject in parallel, the main control unit 26 transmits a synchronization signal for synchronizing a distance measurement operation and an imaging operation to the distance measurement control unit 24.

If the synchronization signal and the distance measurement instruction signal are received, the distance measurement control unit 24 controls the light emission of the laser diode 32 at the timing according to the count signal of the time counter 22 and controls a timing of emitting a laser beam toward the subject. The distance measurement control unit 24 samples the electric signal according to the amount of received light output from the photodiode 36 at the timing according to the count signal of the time counter 22.

The distance measurement control unit 24 derives the distance to the subject based on the light emission timing at which the laser diode 32 emits a laser beam and the light reception timing at which the photodiode 36 receives the laser beam, and outputs distance data representing the derived distance to the main control unit 26. The main control unit 26 displays information relating to the distance to the subject on the view finder 46 based on distance data. The main control unit 26 stores distance data in the storage unit 48.

The measurement of the distance to the subject by the distance measurement control unit 24 will be described in more detail. FIG. 2 is a timing chart showing an example of a timing of the distance measurement operation in the measurement of the distance to the subject in the distance measurement device 10.

In the distance measurement device 10 of this embodiment, a single distance measurement (measurement) sequence includes a voltage adjustment period, an actual measurement period, and a pause period. The voltage adjustment period refers to a period during which a drive voltage of the laser diode 32 and the photodiode 36 is adjusted to an appropriate voltage value. As a specific example, in the distance measurement device 10 of this embodiment, as shown in FIG. 2, the voltage adjustment period is set to several 100 msec (milliseconds).

The actual measurement period refers to a period in which the distance to the subject is actually measured. In the distance measurement device 10 of this embodiment, as a specific example, as shown in FIG. 2, the distance to the subject is measured by repeating an operation to emit a laser beam and to receive the laser beam reflected from the subject several 100 times and measuring the elapsed time from light emission to light reception. That is, in the distance measurement device 10 of this embodiment, in the single measurement sequence, the measurement of the distance to the subject is performed several 100 times.

FIG. 3 is an example of a timing chart showing the timing from light emission to light reception in a single measurement. In a case of performing a distance measurement, the distance measurement control unit 24 outputs a laser trigger for causing the laser diode 32 to emit light according to the count signal of the time counter 22 to the laser diode 32. The laser diode 32 emits light according to the laser trigger. In the distance measurement device 10 of this embodiment, as a specific example, the light emission time of the laser diode 32 is set to several 10 nsec (nanoseconds). The emitted laser beam is emitted toward the subject through the light emitting lens 30 in the optical axis direction of the imaging optical system 40. The laser beam emitted from the distance measurement device 10 is reflected from the subject and reaches the distance measurement device 10. The photodiode 36 of the distance measurement device 10 receives the reflected laser beam through the light receiving lens 34.

In the distance measurement device 10 of this embodiment, as a specific example, the distance measurement device performs a distance measurement for a subject within several km from the distance measurement device 10. The time until the laser beam emitted from the laser diode 32 toward the subject several km ahead through the light emitting lens 30 is returned (received) becomes several km×2/light speed=several μsec (microseconds). Accordingly, in order to measure the distance to the subject several km ahead, as an example, as shown in FIG. 2, the time of at least several μsec is required.

In the distance measurement device 10 of this embodiment, the reciprocation time or the like of the laser beam is considered, and as a specific example, a single measurement time is set to several msec as shown in FIG. 2. Since the reciprocation time of the laser beam is different depending on the distance to the subject, the measurement time for each time may be different depending on the distance assumed by the distance measurement device 10.

In the distance measurement device 10, the distance measurement control unit 24 derives the distance to the subject based on measured values obtained by performing a measurement several 100 times as described above. In the distance measurement control unit 24 of this embodiment, as a specific example, a histogram of measured values for several 100 times is analyzed to derive the distance to the subject. FIG. 4 is a graph showing an example of a histogram of measured values in a case where the distance to the subject is set as a horizontal axis and the measurement frequency is set as a vertical axis. The distance measurement control unit 24 derives the distance to the subject corresponding to a maximum value of the measurement frequency in the above-described histogram as a measurement result and outputs distance data indicating the derived measurement result to the main control unit 26. A histogram may be generated based on the reciprocation time (the elapsed time from light emission to light reception) of the laser beam or ½ of the reciprocation time of the laser beam, or the like, instead of the distance to the subject.

The pause period refers to a period for pausing the driving of the laser diode 32 and the photodiode 36. In the distance measurement device 10 of this embodiment, as a specific example, as shown in FIG. 2, the pause period is set to several 100 msec.

In the distance measurement device 10 of this embodiment, the single measurement time is set to several 100 msec.

In a case of not performing imaging, the main control unit 26 of the distance measurement device 10 of this embodiment displays a live view image on the view finder 46 as described above. The main control unit 26 performs the display of the live view image by displaying the captured images captured in several 10 fps (several 10 msec/image) on the view finder 46 as a motion image. For this reason, during the single measurement period, live view images for several 10 are displayed on the view finder 46.

Next, the imaging operation and the distance measurement operation in a case where the imaging operation and the distance measurement operation in the distance measurement device 10 of this embodiment are synchronized will be described. Hereinafter, as a specific example, an imaging operation and a distance measurement operation in a case where an imaging operation to capture a still image and a distance measurement operation are synchronized will be described.

First, control processing which is executed by the main control unit 26 will be described. FIG. 5 is a flowchart showing an example of a flow of control processing which is executed by the main control unit 26 of the distance measurement device 10 of this embodiment.

The flowchart shown in FIG. 5 is executed if power is supplied to the distance measurement device 10.

First, in Step 100, the main control unit 26 starts a live view operation. As described above, the main control unit 26 displays the live view image on the view finder 46 by performing control for continuously displaying the captured images obtained by the imaging optical system 40 and the imaging element 42 as a motion image.

Next, in Step 102, the main control unit 26 determines whether or not the release button of the operating unit 44 is half-pressed. In a case where the release button is not half-pressed, for example, in a case where the release button is not pressed at all, or the like, the process progresses to Step 132. In a case where the release button is half-pressed, the process progresses to Step 104.

Next, in Step 104, the main control unit 26 controls the imaging optical system 40 and performs AE and AF described above. In the distance measurement device 10, exposure adjustment is performed by performing AE, focusing control is performed by performing AF, and image light indicating the subject is formed on the light receiving surface of the imaging element 42 in a focused state.

Next, in Step 105, the main control unit 26 transmits exposure state for specifying an exposure state at the present time as a result of AE to the distance measurement control unit 24. In Step 105, the main control unit 26 also transmits focusing state specification information for specifying a focusing state at the present time as a result of AF to the distance measurement control unit 24. Examples of the exposure state specification information include an F-number and a shutter speed uniquely determined according to subject brightness, or an F-number and a shutter speed derived from a so-called AE evaluation value uniquely determined according to subject brightness. Other examples of the exposure state specification information include an AE evaluation value. Examples of the focusing state specification information include the subject distance obtained by AF. Hereinafter, for convenience of description, in a case where there is no need for distinction between the exposure state specification information and the focusing state specification information, these are referred to as "specification information".

Next, in Step 106, the main control unit 26 determines whether or not the release button of the operating unit 44 is fully pressed. In a case where the release button is not fully pressed, the process progresses to Step 108.

In Step 108, the main control unit 26 determines whether or not a pressing operation to the release button of the operating unit 44 is released. In a case where pressing is not released, the process returns to Step 104, and this processing is repeated. In a case where pressing is released, the process progresses to Step 132.

In a case where the release button is fully pressed, the process progresses from Step 106 to Step 110.

In Step 110, the main control unit 26 transmits the synchronization signal to the distance measurement control unit 24. In this way, in the distance measurement device 10 of this embodiment, in order to synchronize the imaging operation by the main control unit 26 with the distance measurement operation by the distance measurement control unit 24, prior to the start of the imaging (actual exposure to the imaging element 42), the synchronization signal is transmitted from the main control unit 26 to the distance measurement control unit 24. Though details will be described below, in the distance measurement control unit 24, if the synchronization signal is received, the distance measurement operation (the measurement of the distance to the subject) starts.

Next, in Step 112, the main control unit 26 starts the actual exposure (imaging). With the start of the actual exposure, the pixels of the imaging element 42 are irradiated with light (image light is formed on the light receiving surface of the imaging element 42), and signal charges according to irradiated light are stored in the respective pixels.

Next, in Step 114, the main control unit 26 detects whether or not the actual exposure ends. The process is in a standby state until the actual exposure ends, and in a case where the actual exposure ends, the process progresses to Step 116. A determination method of whether or not the actual exposure ends is not limited, and as a specific example, a determination method based on determination of whether or not an actual exposure time determined under various conditions has elapsed is used.

In Step 116, the main control unit 26 starts the reading of the signal charges stored in the respective pixels of the imaging element 42.

Next, in Step 118, the main control unit 26 outputs a reading start signal indicating the start of the reading to the distance measurement control unit 24. The signal charges read from the respective pixels are transmitted to the main control unit 26 as electrical signals (image signals), which are digital signals according to the signal charges.

Next, in Step 120, the main control unit 26 determines whether or not it is the horizontal blanking period. As described above, in a case of reading the signal charges from the pixels of the imaging element 42, since the signal charges are read in units of pixels for each pixel row, the horizontal blanking period during which the reading of the signal charges are not performed is generated between the pixel rows. The main control unit 26 determines whether or not it is the horizontal blanking period, and in a case where it is not the horizontal blanking period, for example, while the signal charges are read from the pixels of one pixel row, the process progresses to Step 124. In a case of the horizontal blanking period, the process progresses to Step 122.

In Step 122, the main control unit 26 transmits a light emission instruction signal to the distance measurement control unit 24. Though details will be described below, if the light emission instruction signal is received, the distance measurement control unit 24 causes the laser diode 32 to emit light based on the received light emission instruction signal.

Next, in Step 124, the main control unit 26 determines whether or not to end the reading. In a case where the signal charges are not yet read from all pixels of the imaging element 42, the process returns to Step 120, and this processing is repeated. In a case where the signal charges are read from all pixels of the imaging element 42, the process progresses to Step 126.

In Step 126, the main control unit 26 transmits a reading end signal indicating the end of the reading to the distance measurement control unit 24.

Next, in Step 128, the main control unit 26 determines whether or not distance data is received. Though details will be described below, if the distance measurement is performed, the distance measurement control unit 24 transmits distance data indicating a measurement result (finally derived distance) to the main control unit 26. The main control unit 26 is in a standby state until distance data transmitted from the distance measurement control unit 24 is received, and in a case where distance data is received, progresses to Step 130.

In Step 130, the main control unit 26 displays information relating to the distance to the subject on the view finder 46 based on received distance data so as to be superimposed on a live view image. The main control unit 26 stores received distance data in the storage unit 48 in correlation with a captured image obtained by imaging. With this step, the captured image (image data indicating the captured image) obtained by imaging the subject and the distance (distance data) to the subject are stored in the storage unit 48 in correlation with each other.

Next, in Step 132, the main control unit 26 determines whether or not a power switch (not shown) is turned off. In a case where the power switch is not turned off, the process returns to Step 102, and this processing is repeated. In a case where the power switch is turned off, the process progresses to Step 134.

In Step 134, the main control unit 26 stops the live view operation, and then, ends this processing. The main control unit 26 turns off the power supply of the distance measurement device 10.

Figure 6A:
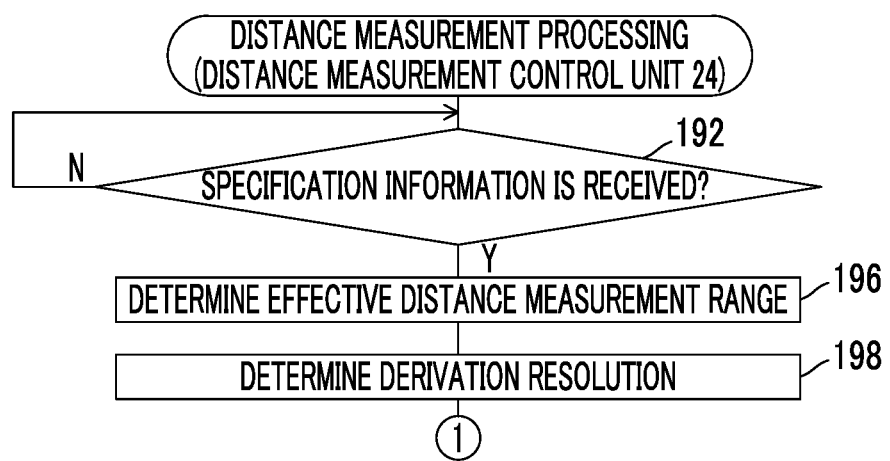
FIG. 6A is a flowchart showing an example of a flow of distance measurement processing which is executed by a distance measurement control unit of the distance measurement device according to the embodiment.

Next, distance measurement processing which is executed by the distance measurement control unit 24 will be described. FIGS. 6A and 6B are flowcharts showing an example of a flow of distance measurement processing which is executed by the distance measurement control unit 24 of the distance measurement device 10 of this embodiment. FIG. 7 is an example of a timing chart showing the timings of the imaging operation and the distance measurement operation.

The flowcharts shown in FIGS. 6A and 6B are executed if power is supplied to the distance measurement device 10.

First, in Step 192, the distance measurement control unit 24 determines whether or not the specification information transmitted in Step 105 of the above-described control processing is received. In Step 192, in a case where the specification information is not received, the determination is negative, and the distance measurement control unit 24 performs the determination of Step 192 again. In Step 192, in a case where the specification information is received, the determination is affirmative, and the process progresses to Step 194.

Next, in Step 196, the distance measurement control unit 24 determines an effective distance measurement range (an example of a distance range according to the technique of the present disclosure) based on the focusing state specification information received in Step 192. For example, the distance measurement control unit 24 determines the effective distance measurement range with reference to a range derivation table (not shown) in which an effective distance measurement range is uniquely derived from the focusing state specification information.

The effective distance measurement range is a distance range which is used when determining the frequency of each distance obtained by performing the derivation of the distance to the subject multiple times. That is, the effective distance measurement range indicates an effective range of a distance to be derived in Step 222 described below, and means the range of a subject distance estimated from the focusing state specification information and the vicinity thereof.

Examples of the range derivation table include a table in which a moving direction and a moving distance of a focus lens from a reference position determined in advance are correlated with an effective distance measurement range. The moving direction and the moving distance are specified by the focusing state specification information.

The distance measurement control unit 24 may determine the effective distance measurement range using an arithmetic expression with the focusing state specification information as an independent variable and the effective distance measurement range as a dependent variable as without using the range derivation table.

Next, in Step 198, the distance measurement control unit 24 determines a derivation resolution uniquely determined from the effective distance measurement range determined in Step 196.

The derivation resolution is a resolution increased according to the effective distance measurement range determined in Step 196 and is set to be higher than a predetermined resolution. The predetermined resolution used herein indicates, for example, a resolution which is used in a case of performing a distance measurement (in a case of deriving the distance to the subject) without being bound by the effective distance measurement range. In this embodiment, as an example of the derivation resolution, a resolution which is set to be higher than the predetermined resolution using a number of bits (for example, 8 bits) determined in advance as the number of bits defining the predetermined resolution is used.

Next, in Step 200, the distance measurement control unit 24 determines whether or not the synchronization signal is received. Specifically, the distance measurement control unit 24 determines whether or not the synchronization signal transmitted from the main control unit 26 in Step 110 of the control processing in the main control unit 26 described above is received. The process is in a standby state until the synchronization signal is received, and if the synchronization signal is received, the process progresses to Step 202.

In Step 202, the distance measurement control unit 24 transits to the voltage adjustment period shown in FIG. 7 as an example and performs voltage adjustment of the drive voltage of the laser diode 32 and the photodiode 36. With this, the emission intensity of the laser beam of the laser diode 32 is adjusted and the light receiving sensitivity of the photodiode 36 is adjusted.

Figure 10:
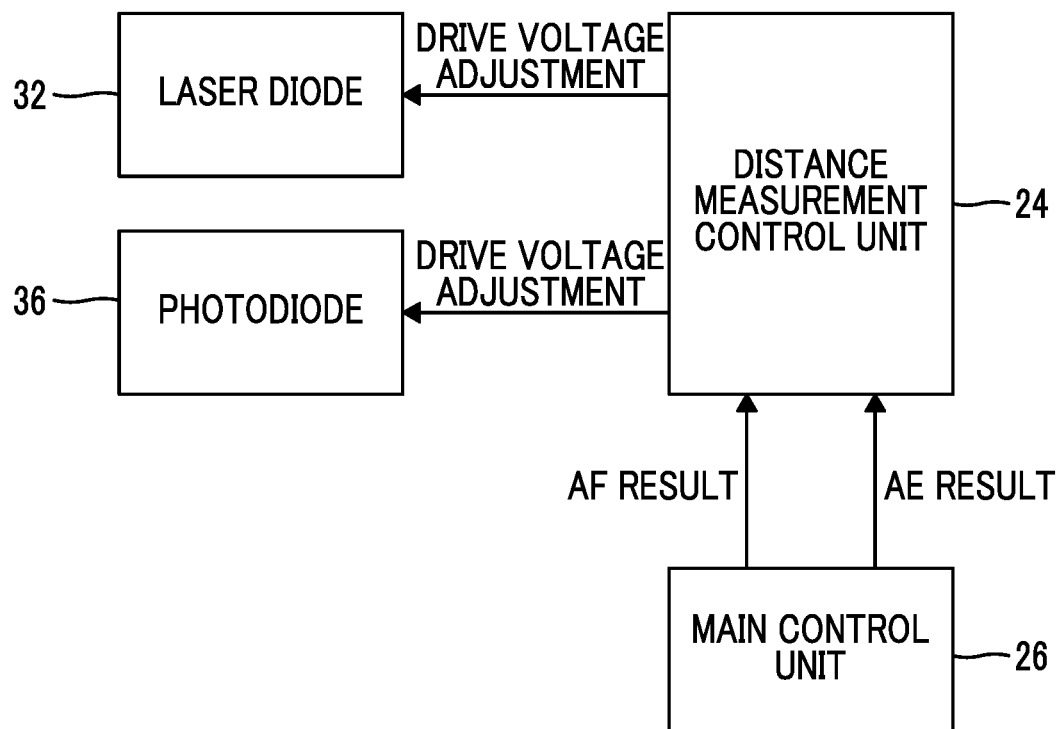
FIG. 10 is a block diagram showing an example of adjustment of a drive voltage based on AF and AE results.

The emission intensity of the laser beam emitted from the laser diode 32 is adjusted based on the specification information received in Step 192. For example, the distance measurement control unit 24 adjusts the emission intensity of the laser beam with reference to an intensity setting table (not shown) in which voltage information indicating the drive voltage of the laser diode 32 is uniquely derived from the specification information. That is, the distance measurement control unit 24 derives the voltage information corresponding to the specification information received in Step 192 from the intensity setting table and performs the voltage adjustment such that the drive voltage indicated by the derived voltage information is applicable to the laser diode 32 (see FIG. 10).

Examples of the intensity setting table include a table in which voltage information representing the shorter a distance to a principal subject, the lower the emission intensity of the laser beam, and the smaller the amount of ambient light (the larger the exposure), the lower the emission intensity of the laser beam is stored. The distance to the principal subject is specified by the focusing state specification information, and the amount of ambient light is specified by the exposure state specification information. Ambient light becomes noise for the laser beam, and this means that the smaller the amount of ambient light (the larger the exposure), the smaller the noise of the laser beam becomes. Accordingly, in Step 202, the distance measurement control unit 24 performs the voltage adjustment such that the emission intensity of the laser beam becomes small in a case where the amount of ambient light is small. Since the exposure becoming large means that subject brightness becomes low, the lower the subject brightness, the lower the emission intensity may be set.

The distance measurement control unit 24 may adjust the emission intensity of the laser beam based on the voltage information derived by an arithmetic expression with the exposure state specification information and the focusing state specification information as independent variables and the voltage information as a dependent variable without using the intensity setting table.

Here, although a case where the emission intensity of the laser beam is adjusted based on the exposure state specification information and the focusing state specification information received in Step 192 has been illustrated, the technique of the present disclosure is not limited thereto. For example, the emission intensity of the laser beam may be adjusted based on the exposure state specification information or the focusing state specification information.

The light receiving sensitivity of the photodiode 36 is adjusted based on the focusing state specification information received in Step 192. For example, the distance measurement control unit 24 adjusts the light receiving sensitivity of the photodiode 36 with reference to a sensitivity adjustment table (not shown) in which the voltage information indicating the drive voltage of the photodiode 36 is uniquely derived from the specification information. That is, the distance measurement control unit 24 derives the voltage information corresponding to the focusing state specification information received in Step 192 from the sensitivity adjustment table and performs the voltage adjustment such that the drive voltage indicated by the derived voltage information is applicable to the photodiode 36 (see FIG. 10).

Examples of the sensitivity adjustment table include a table in which voltage information representing the shorter the distance to the principal subject, the lower the light receiving sensitivity of the photodiode 36 is stored.

The distance measurement control unit 24 may set the light receiving sensitivity of the photodiode 36 based on voltage information derived by an arithmetic expression with the focusing state specification information as an independent variable and the voltage information as a dependent variable without using the sensitivity adjustment table.

Next, in Step 204, the distance measurement control unit 24 determines whether or not the voltage adjustment ends. In this embodiment, as an example, as shown in FIG. 7, the voltage adjustment period is set to several 100 msec. For this reason, the distance measurement control unit 24 determines that the voltage adjustment ends in a case where several 100 msec have elapsed after the transition to the voltage adjustment period. Accordingly, the distance measurement control unit 24 determines that the voltage adjustment does not end and is in a standby state until several 100 msec have elapsed after the transition to the voltage adjustment period, and in a case where several 100 msec have elapsed, determines that the voltage adjustment ends and progresses to Step 206.

In Step 206, the distance measurement control unit 24 transits to the measurement period and starts to measure the distance to the subject.

Next, in Step 208, the distance measurement control unit 24 determines whether or not the reading start signal is received. Specifically, the distance measurement control unit 24 determines whether or not the reading start signal transmitted from the main control unit 26 in Step 118 of the control processing in the main control unit 26 described above is received. In the distance measurement control unit 24 of the distance measurement device 10 of this embodiment, since control in the measurement of the distance to the subject is different between a period (hereinafter, referred to as a "reading period") during which the charge signals are read from the pixels and a period out of the reading period, the reading start signal is received from the main control unit 26. Then, control in the measurement, specifically, control for light emission of the laser diode 32 is different according to the presence or absence of reception of the reading start signal. In order to make the laser diode 32 emit light, the drive voltage for driving the laser diode 32 is applied to the laser diode 32. If the drive voltage is applied to the laser diode 32 while the charge signals are being read from the pixels of the imaging element 42, in the distance measurement device 10, variation in voltage may occur, and noise may be superimposed on the charge signals read from the pixels due to variation in voltage. In this way, disruption may occur in the captured image due to noise superimposed on the charge signals.

For this reason, the distance measurement control unit 24 of the distance measurement device 10 of this embodiment performs control such that, in a reading period, the laser diode 32 emits light in the above-described horizontal blanking period which is a period during which the charge signals are not read from the pixels. That is, the distance measurement control unit 24 performs control such that, in the reading period, the laser diode 32 emits light in synchronization with the imaging operation.

As described above, in a period out of the reading period, since superimposition of noise due to variation in voltage does not cause a problem, the laser diode 32 may not emit light in synchronization with the imaging operation.

In this case, as described above, the laser diode 32 may emit light every several msec according to each measurement. Hereinafter, control by the distance measurement control unit 24 in a period out of the reading period is referred to as "normal control".

In Step 208, since the distance measurement control unit 24 performs the normal control in a case where the reading start signal is not received, the process progresses to Step 216. In a case where the distance measurement control unit 24 receives the reading start signal, the process progresses to Step 210.

In Step 210, the distance measurement control unit 24 determines whether or not the reading end signal is received. Specifically, the distance measurement control unit 24 determines whether or not the reading end signal transmitted from the main control unit 26 in Step 126 of the control processing in the main control unit 26 described above is received.

Since the distance measurement control unit 24 performs the normal control in a subsequent period in a case where the reading end signal is received, the process progresses to Step 216. In a case where the distance measurement control unit 24 does not receive the reading end signal, the process progresses to Step 212.

In Step 212, the distance measurement control unit 24 determines whether or not the light emission instruction signal is received. Specifically, the distance measurement control unit 24 determines whether or not the light emission instruction signal transmitted from the main control unit 26 in Step 122 of the control processing in the main control unit 26 described above is received.

In a case where the distance measurement control unit 24 does not receive the light emission instruction signal, that is, in a case where it is in the reading period and it is not yet in the horizontal blanking period, the process is in the standby state. In a case where the distance measurement control unit 24 receives the light emission instruction signal, the process progresses to Step 214.

In Step 214, it is determined whether or not the measurement is being performed. In the distance measurement device 10 of this embodiment, the interval (the reading time of the charge signals from the pixels of one pixel row) between the horizontal blanking periods is shorter than the single measurement time (in the specific example described above, several msec). For this reason, before the measurement ends, the next horizontal blanking period may be reached, and the light emission instruction signal may be transmitted from the main control unit 26 to the distance measurement control unit 24. The distance measurement control unit 24 of this embodiment neglects the received light emission instruction signal in a case where the light emission instruction signal is received during the measurement, whereby the laser diode 32 does not emit light. For this reason, in a case where the measurement is being performed, the process progresses to Step 226. In a case where the measurement is not being performed, the process progresses to Step 216.

In Step 216, the distance measurement control unit 24 causes the laser diode 32 to emit light such that a laser beam having emission intensity adjusted in Step 202 is emitted.

Next, in Step 218, the distance measurement control unit 24 determines whether or not a predetermined time has elapsed. Specifically, as described above, since the single measurement time is set to several msec, the distance measurement control unit 24 determines whether or not several msec have elapsed. In a case where the predetermined time (in this embodiment, several msec which are the single measurement time) has not elapsed, the process is in the standby state, and in a case where the predetermined time has elapsed, the process progresses to Step 220.

The laser diode 32 emits light through the processing of Step 216, whereby the laser beam is emitted toward the subject through the light emitting lens 30. The laser beam reflected from the subject is received by the photodiode 36 through the light receiving lens 34 until the predetermined time elapses. The distance measurement control unit 24 acquires the elapsed time from light emission to light reception in a case where the laser beam is received by the photodiode 36 and stores the elapsed time in the storage unit (for example, the RAM or the like in the distance measurement control unit 24).

For example, in a case where the subject moves, or the like, the elapsed time from light emission to light reception of the laser beam exceeds several msec, and the laser beam may not be returned (reflected light may not be received). In this case, a measurement error occurs. In a case where a measurement error occurs, the distance measurement control unit 24 stores the effect in the storage unit (for example, the RAM or the like in the distance measurement control unit 24), and the occurrence of the measurement error may be displayed on the view finder 46 or the like according to the frequency of the occurrence of the measurement error, for example, if the frequency is not negligible in deriving the distance to the subject using a histogram. In this way, in a case where a measurement error occurs, the main control unit 26 may not store the captured image in the storage unit 48. In this case, the user can set whether or not to store the captured image through the operating unit 44 (an example of a storage setting unit according to the technique of the present disclosure).

Next, in Step 220, the distance measurement control unit 24 determines whether or not a predetermined number of measurements end. In Step 220, in a case where a predetermined number of measurements end, the determination is affirmative, and the process progresses to Step 222. In Step 220, in a case where a predetermined number of measurements do not end, the determination is negative, and the process progresses to Step 208.

In Step 222, first, the distance measurement control unit 24 derives the distance to the subject based on the time from when the laser beam is emitted through the processing of Step 216 until the photodiode 36 receives the laser beam. As an example, as shown in FIG. 4, the distance measurement control unit 24 generates a histogram of the derived distance to the subject with the predetermined resolution. Next, as an example, as shown in FIG. 4, the distance measurement control unit 24 reconstructs a histogram of the distance to the subject using the derivation resolution within the effective distance measurement range determined in the processing of Step 196. The distance measurement control unit 24 analyzes the histogram within the effective distance measurement range and generates distance data representing the analyzed distance (in the example shown in FIG. 4, the distance having the maximum measurement frequency). Here, the distance represented by distance data is a final distance (final output) which is provided to the user.

The histogram generated with the derivation resolution is segmented in contrast to the histogram generated with the predetermined resolution. Accordingly, the distance obtained by analyzing the histogram is expressed in units of minute numerical values (units of smaller numerical values) in contrast to the distance obtained by analyzing the histogram generated with the predetermined resolution.

Next, in Step 224, the distance measurement control unit 24 transmits distance data generated in Step 222 to the main control unit 26, and then, the process progresses to Step 226.

In Step 226, the distance measurement control unit 24 determines whether or not conditions (end conditions) determined in advance as conditions for ending this distance measurement processing are satisfied. An example of the end conditions is a condition that an end instruction from the user is received by the operating unit 44. In Step 226, in a case where the end conditions are not satisfied, the determination is negative, and the process progresses to Step 212. In Step 226, in a case where the end conditions are satisfied, the determination is affirmative, and this distance measurement processing ends.

As described above, in the distance measurement device 10 according to this embodiment, control is performed such that the imaging period and the distance measurement period overlap each other. Accordingly, the distance measurement device 10 can efficiently execute imaging and a distance measurement compared to a case where an imaging period and a distance measurement period do not overlap each other.

In the distance measurement device 10 according to this embodiment, control is performed such that the timing at which imaging is started and the distance measurement start timing are synchronized with each other. Accordingly, the distance measurement device 10 can efficiently execute imaging and a distance measurement compared to a case where a distance measurement is started at the timing later than the timing at which imaging is started.

In the distance measurement device 10 according to this embodiment, control is performed such that the timing at which the actual exposure is started and the distance measurement start timing are synchronized with each other. Accordingly, the distance measurement device 10 can efficiently execute imaging and a distance measurement compared to a case where a distance measurement is started at the timing later than the timing at which actual exposure is started.

In the distance measurement device 10 according to this embodiment, information relating to the distance having a high frequency among the distances obtained by performing the derivation of the distance to the subject multiple times is displayed on the view finder 46. Accordingly, the distance measurement device 10 can provide information relating to a distance highly necessary for the user to the user compared to a case where a configuration in which information relating to the distance having a high frequency among the distances obtained by performing the derivation of the distance to the subject multiple times is displayed on the view finder 46 is not provided.

In the distance measurement device 10 according to this embodiment, the effective distance measurement range is determined based on the focusing state specification information when the distance to the subject is derived, and the distance to the subject is derived based on the determined effective distance measurement range. Accordingly, the distance measurement device 10 can derive a final distance within a distance range focused by the user compared to a case where the effective distance measurement range is not determined based on the focusing state specification information.

In the distance measurement device 10 according to this embodiment, the distance to the subject is derived with the resolution increased according to the effective distance measurement range determined based on the focusing state specification information. Accordingly, the distance measurement device 10 can minutely derive a final distance compared to a case where the distance to the subject is derived without using the resolution increased according to the effective distance measurement range.

In the distance measurement device 10 according to this embodiment, the laser beam having the emission intensity adjusted according to at least one of the focusing state specification information or the exposure state specification information is emitted from the laser diode 32. Accordingly, the distance measurement device 10 can suppress the emission of the laser beam by the laser diode 32 in a state where the emission intensity is excessive and deficient compared to a case where the emission intensity of the laser beam is adjusted without using the focusing state specification information and the exposure state specification information.

In the distance measurement device 10 according to this embodiment, reflected light of the laser beam from the subject is received by the photodiode 36 with the light receiving sensitivity adjusted according to the focusing state specification information. Accordingly, the distance measurement device 10 can suppress the reception of reflected light by the photodiode 36 in a state where the light receiving sensitivity is excessive and deficient compared to a case where the light receiving sensitivity of the photodiode 36 is adjusted without using the focusing state specification information.

In the distance measurement device 10 according to this embodiment, a live view image is displayed on the view finder 46 and information relating to the distance to the subject is displayed on the view finder 46 in parallel with the display of the live view image. Accordingly, the distance measurement device 10 can make the user accurately ascertain the relationship between the state of the subject and the distance to the subject compared to a case where information relating to the distance to the subject is not displayed on the view finder 46 in parallel with the display of the live view image.

In the above-described embodiment, although a case where a timing at which the actual exposure is started and the distance measurement start timing are synchronized with each other has been illustrated, the technique of the present disclosure is not limited thereto. For example, the timing at which the actual exposure ends and the distance measurement start timing may be synchronized with each other. In this case, for example, in a case where the determination in Step 114 is affirmative, the synchronization signal may be transmitted to the distance measurement control unit 24. With this, the distance measurement device 10 can efficiently execute imaging and a distance measurement compared to a case where a distance measurement is started at the timing later than the timing at which actual exposure ends.

The reading end timing of the signal charges and the distance measurement start timing may be synchronized with each other. In this case, for example, when the processing of Step 126 ends, the synchronization signal may be transmitted to the distance measurement control unit 24. With this, the distance measurement device 10 can efficiently execute imaging and a distance measurement compared to a case where a distance measurement is started at the timing later than the reading end timing of the signal charges.

In the above-described embodiment, although a case where the voltage adjustment is performed simultaneously with the distance measurement start timing and the actual exposure start timing has been illustrated, the technique of the present disclosure is not limited thereto, and as an example, as shown in FIG. 8, the voltage adjustment may be performed prior to the start of the distance measurement and the start of the actual exposure.

In the above-described embodiment, although a case where the histogram of the distance to the subject in terms of the measurement frequency is generated has been illustrated, the technique of the present disclosure is not limited thereto. For example, a histogram of the time required for the reciprocation from the emission to the reception of the laser beam in terms of the measurement frequency may be generated. Furthermore, a time range corresponding to an effective distance measurement range may be set and a histogram may be reconstructed with a resolution increased according to the time range. In this case, for example, the distance to the subject derived based on the time of a maximum value of the reconstructed histogram may be set as the distance to be finally output (the distance to be presented to the user).

Figure 9A:
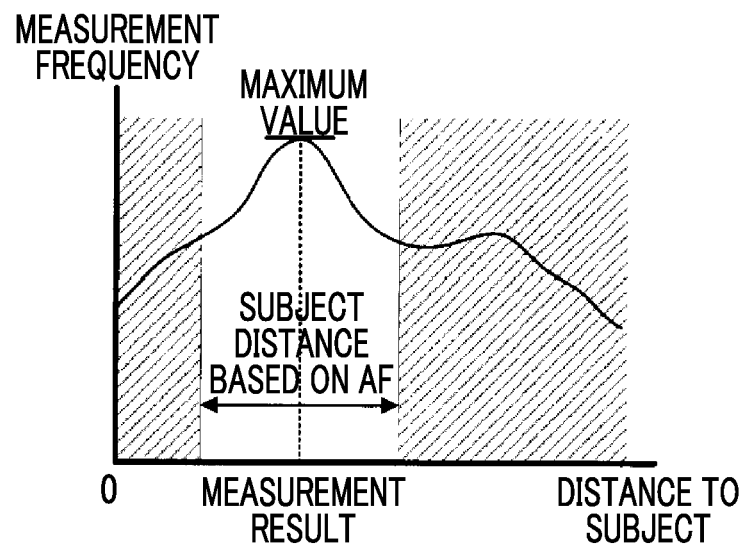
FIG. 9A is a modification example of a histogram obtained in the distance measurement device according to the embodiment, and is a diagram illustrating an example of deriving a distance to a subject without using a measurement result other than a subject distance range based on AF.
Figure 9B:
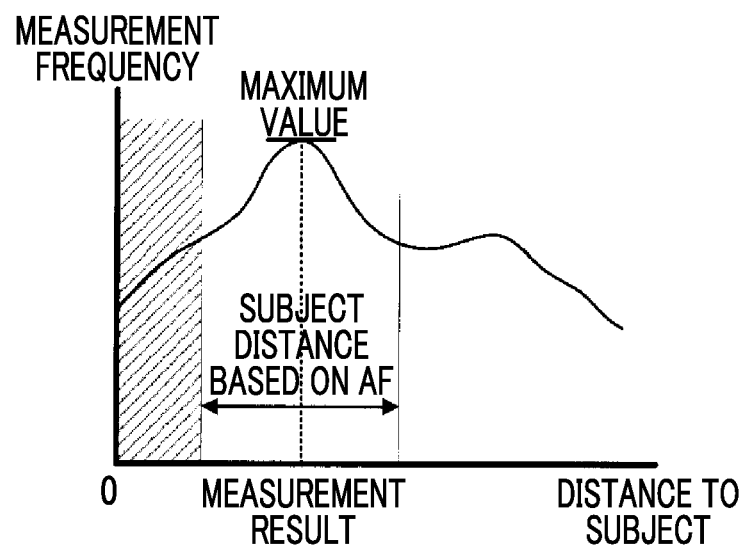
FIG. 9B is a modification example of a histogram obtained in the distance measurement device according to the embodiment, and is a diagram illustrating an example of deriving a distance to a subject without using a measured value of a distance less than a subject distance based on AF.
Figure 9C:
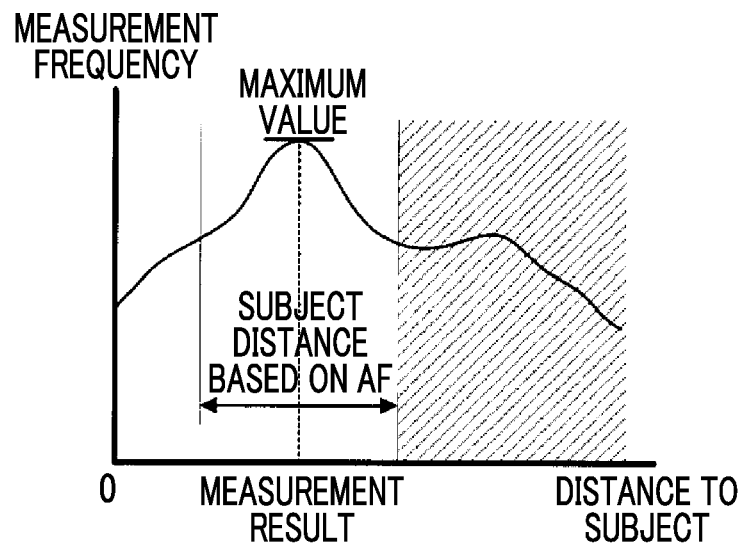
FIG. 9C is a modification example of a histogram obtained in the distance measurement device according to the embodiment, and is a diagram illustrating an example of deriving a distance to a subject without using a measured value of a distance longer than a subject distance based on AF.

In the above-described embodiment, as an example, as shown in FIGS. 4 and 9A, although a case where both end portions of the histogram for all data are not included in the effective distance measurement range (in the example shown in FIG. 9A, a non-hatched range) has been illustrated, the technique of the present disclosure is not limited thereto, and as an example, as shown in FIGS. 9B and 9C, one end portion (hatched portion) of the histogram may not be included in the effective distance measurement range (in the examples shown in FIGS. 9B and 9C, a non-hatched range).

In the above-described embodiment, for convenience of description, although a case where the histogram (histogram for all data) which is generated once is reconstructed based on the effective distance measurement range has been illustrated, the technique of the present disclosure is not limited thereto. For example, the distance measurement control unit 24 may generate a histogram for the distances excluding the distances outside the effective distance measurement range among the distances (all data) to the subject obtained by performing the derivation multiple times. In this case, the distance measurement control unit 24 may generate the histogram with the above-described derivation resolution.

In the above-described embodiment, although a case where information relating to the distance to the subject is displayed on the view finder 46 so as to be superimposed on a live view image has been illustrated, the technique of the present disclosure is not limited thereto. For example, information relating to the distance to the subject may be displayed in a display area different from the display area of the live view image. In this way, information relating to the distance to the subject may be displayed on the view finder 46 in parallel with the display of the live view image.

In the above-described embodiment, although a case where the release button provided in the distance measurement device 10 is operated has been illustrated, the technique of the present disclosure is not limited thereto. For example, AE and AF may be started in response to an imaging preparation instruction received by a user interface (UI) unit of an external device used in the form of being connected to the distance measurement device 10, and actual exposure may be started in response to an imaging instructed received by the UI unit of the external device. Examples of the external device used in the form of being connected to the distance measurement device 10 include a smart device, a personal computer (PC), or a spectacles type or a wristwatch type wearable terminal device.

In the above-described embodiment, although a case where the live view image and the distance measurement result (information relating to the distance to the subject) are displayed on the view finder 46 has been illustrated, the technique of the present disclosure is not limited thereto. For example, at least one of the live view image or the distance measurement result may be displayed on a display unit of the external device used in the form of being connected to the distance measurement device 10. Examples of the display unit of the external device used in the form of being connected to the distance measurement device 10 include a display of a smart device, a display of a PC, or a display of a wearable terminal device.

In the above-described embodiment, for convenience of description, although description has been provided on an assumption that there is no AF error, the technique of the present disclosure is not limited thereto. That is, the distance measurement control unit 24 may derive the distance as described above in a case where an AF error does not occur, and may not derive the distance in a case where an AF error occurs.

In the above-described embodiment, for convenience of description, although description has been provided on an assumption that there is no AE error, the technique of the present disclosure is not limited thereto. That is, the distance measurement control unit 24 may derive the distance as described above in a case where an AE error does not occur, and may not derive the distance in a case where an AE error occurs.

In the above-described embodiment, although the focus adjustment and the exposure adjustment by AF and AE have been illustrated, the technique of the present disclosure is not limited thereto, focus adjustment by manual focus and exposure adjustment by manual exposure may be applied.

In the above-described embodiment, although a case where the technique of the present disclosure is applied to the distance measurement device 10 has been illustrated, the technique of the present disclosure is not limited thereto, and the technique of the present disclosure may be applied to a digital camera (imaging device).

In the above-described embodiment, although a case where the voltage adjustment is performed in Step 202 has been illustrated, the technique of the present disclosure is not limited thereto, and the voltage adjustment may not necessarily be performed.

The control processing (see FIG. 5) and the distance measurement processing (see FIGS. 6A and 6B) described in the above-described embodiment are merely examples. Accordingly, it is needless to say that unnecessary steps may be deleted, new steps may be added, or the processing order may be rearranged without departing the gist of the invention. The respective processing included in the control processing and the distance measurement processing described in the above-described embodiment may be realized by a software configuration using a computer by executing a program, or may be realized by other hardware configurations. Furthermore, the respective processing may be realized by a combination of a hardware configuration and a software configuration.

In the above-described embodiment, although a case where the light emission frequency of the laser beam is fixed has been illustrated, the technique of the present disclosure is not limited thereto. Since ambient light becomes noise for the laser beam, the light emission frequency of the laser beam may be a light emission frequency determined according to subject brightness.

Hereinafter, an example of a way of determining the light emission frequency of the laser beam will be described.

Figures 11, 12:
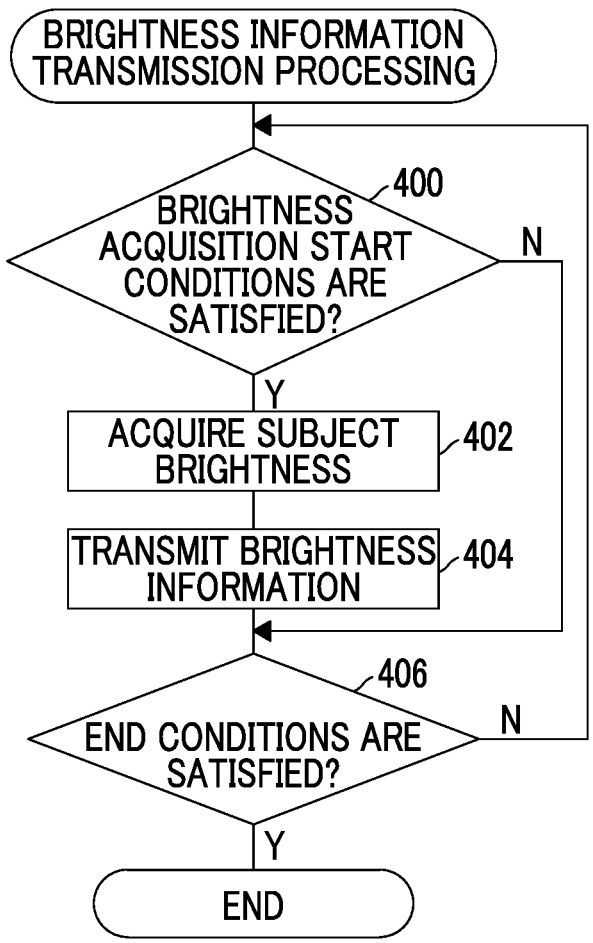
FIG. 11 is a conceptual diagram showing an example of the configuration of a light emission frequency determination table.
FIG. 12 is a flowchart showing an example of a flow of brightness information transmission processing.

The light emission frequency of the laser beam is derived from a light emission frequency determination table 300 shown in FIG. 11 as an example. In the light emission frequency determination table 300, the subject brightness and the light emission frequency of the laser beam are correlated with each other such that the higher the subject brightness, the larger the light emission frequency of the laser beam becomes. That is, in the light emission frequency determination table 300, the subject brightness has a magnitude relationship of $L_1<L_2<\ldots<L_n$, and the light emission frequency has a magnitude relationship of $N_1<N_2<\ldots<N_n$. In the example shown in FIG. 2, although the light emission frequency in units of 100 times has been illustrated, the invention is not limited thereto, and the light emission frequency may be determined in units often times or once by the light emission frequency determination table 300.

In the distance measurement device 10, in order to realize the derivation of the light emission frequency of the laser beam by the light emission frequency determination table 300, brightness information transmission processing (see FIG. 12) is executed by the main control unit 26, and light emission frequency determination processing (see FIG. 13) is executed by the distance measurement control unit 24.

First, the brightness information transmission processing which is executed by the main control unit 26 if the power switch of the distance measurement device 10 is turned on will be described referring to FIG. 12.

In the brightness information transmission processing shown in FIG. 12, first, in Step 400, the main control unit 26 determines whether or not brightness acquisition start conditions which are conditions for starting acquisition of subject brightness are satisfied. An example of the brightness acquisition start conditions is a condition that the release button is half-pressed. Another example of the brightness acquisition start conditions is a condition that the captured image is output from the imaging element 42.

In Step 400, in a case where the brightness acquisition start conditions are satisfied, the determination is affirmative, and the process progresses to Step 402. In Step 400, in a case where the brightness acquisition start conditions are not satisfied, the determination is negative, and the process progresses to Step 406.

In Step 402, the main control unit 26 acquires the subject brightness from the captured image, and then, the process progresses to Step 404. Here, although a case where the subject brightness is acquired from the captured image has been illustrated, the technique of the present disclosure is not limited thereto. For example, if a brightness sensor which detects subject brightness is mounted in the distance measurement device 10, the main control unit 26 may acquire the subject brightness from the brightness sensor.

In Step 404, the main control unit 26 transmits brightness information indicating the subject brightness acquired in Step 402 to the distance measurement control unit 24, and then, the process progresses to Step 406.

In Step 406, the main control unit 26 determines whether or not end conditions which are conditions for ending this brightness information transmission processing are satisfied. An example of the end conditions is a condition that the power switch of the distance measurement device 10 is turned off. In Step 406, in a case where the end conditions are not satisfied, the determination is negative, and the process progresses to Step 400. In Step 406, in a case where the end conditions are satisfied, the determination is affirmative, and this brightness information transmission processing ends.

Next, the light emission frequency determination processing which is executed by the distance measurement control unit 24 if the power switch of the distance measurement device 10 is turned on will be described referring to FIG. 13.

In the light emission frequency determination processing shown in FIG. 13, first, in Step 410, the distance measurement control unit 24 determines whether or not the brightness information transmitted by executing the processing of Step 404 is received. In Step 410, in a case where the brightness information transmitted by executing the processing of Step 404 is not received, the determination is negative, and the process progresses to Step 416. In Step 410, in a case where the brightness information transmitted by executing the processing of Step 404 is received, the determination is affirmative, and the process progresses to Step 412.

In Step 412, the distance measurement control unit 24 derives the light emission frequency corresponding to the subject brightness indicated by the brightness information received in Step 410 from the light emission frequency determination table 300, and then, the process progresses to Step 414.

In Step 414, the distance measurement control unit 24 stores the light emission frequency derived in the processing of Step 412 in the storage unit 48, and then, the process progresses to Step 416. The light emission frequency stored in the storage unit 48 by the processing of Step 416 means "a predetermined number of times" in Step 218 of the distance measurement processing shown in FIG. 6B.

In Step 416, the main control unit 26 determines whether or not end conditions which are conditions for ending this light emission frequency determination processing are satisfied. An example of the end conditions is a condition that the power switch of the distance measurement device 10 is turned off. In Step 416, in a case where the end conditions are not satisfied, the determination is negative, and the process progresses to Step 410. In Step 416, in a case where the end conditions are satisfied, the determination is affirmative, and this light emission frequency determination processing ends.

Next, another example of a way of determining the light emission frequency of the laser beam will be described.

As an example, the light emission frequency of the laser beam is derived according to a light emission frequency determination table 500 shown in FIG. 14. In the light emission frequency determination table 500, exposure state specification information $(E_1, E_2, \ldots, E_n)$ uniquely determined according to the subject brightness and the light emission frequency $(N_1, N_2, \ldots, N_n)$ of the laser beam are correlated with each other. Here, the exposure state specification information uniquely determined according to the subject brightness means, for example, exposure state specification information indicating that, the higher the subject brightness, the lower the exposure becomes.

In a case of deriving the light emission frequency of the laser beam using the light emission frequency determination table 500, exposure state specification information transmission processing (see FIG. 15) is executed by the main control unit 26, and light emission frequency determination processing (see FIG. 16) is executed by the distance measurement control unit 24.

First, the exposure state specification information transmission processing which is executed by the main control unit 26 if the power switch of the distance measurement device 10 is turned on will be described referring to FIG. 15.

Figure 15:
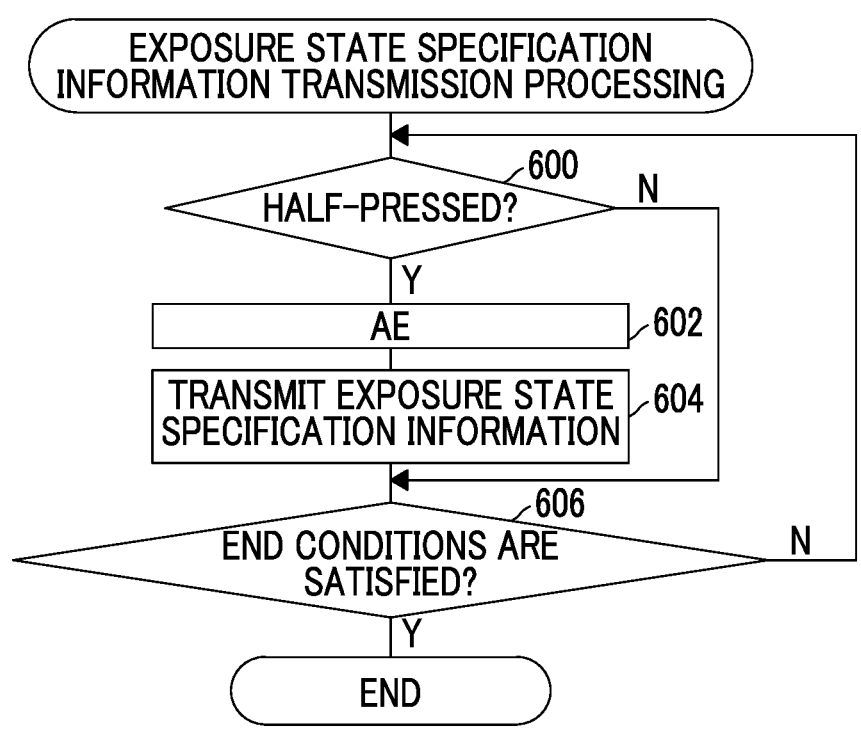
FIG. 15 is a flowchart showing another example of a flow of exposure state specification information transmission processing.

In the exposure state specification information transmission processing shown in FIG. 15, first, in Step 600, the main control unit 26 determines whether or not the release button is half-pressed. In Step 600, in a case where the release button is not half-pressed, the determination is negative, and the process progresses to Step 606. In Step 600, in a case where the release button is half-pressed, the determination is affirmative, and the process progresses to Step 602. In FIG. 15, although a case where the operating unit 44 comprises the release button has been described as an example, the technique of the present disclosure is not limited thereto. For example, in a case where the operating unit 44 comprises a distance measurement imaging start button, Step 600 may be omitted, and in a case where power is supplied, the processing of Step 602 may be started.

In Step 602, the main control unit 26 performs AE based on the subject brightness acquired from the captured image, and then, the process progresses to Step 604.

In Step 604, the main control unit 26 transmits the exposure state specification information to the distance measurement control unit 24, and then, the process progresses to Step 606.

In Step 606, the main control unit 26 determines whether or not end conditions which are conditions for ending this exposure state specification information transmission processing are satisfied. An example of the end conditions is a condition that the power switch of the distance measurement device 10 is turned off. In Step 606, in a case where the end conditions are not satisfied, the determination is negative, and the process progresses to Step 600. In Step 606, in a case where the end conditions are satisfied, the determination is affirmative, and this exposure state specification information transmission processing ends.

Next, the light emission frequency determination processing which is executed by the distance measurement control unit 24 if the power switch of the distance measurement device 10 is turned on will be described referring to FIG. 16.

Figure 16:
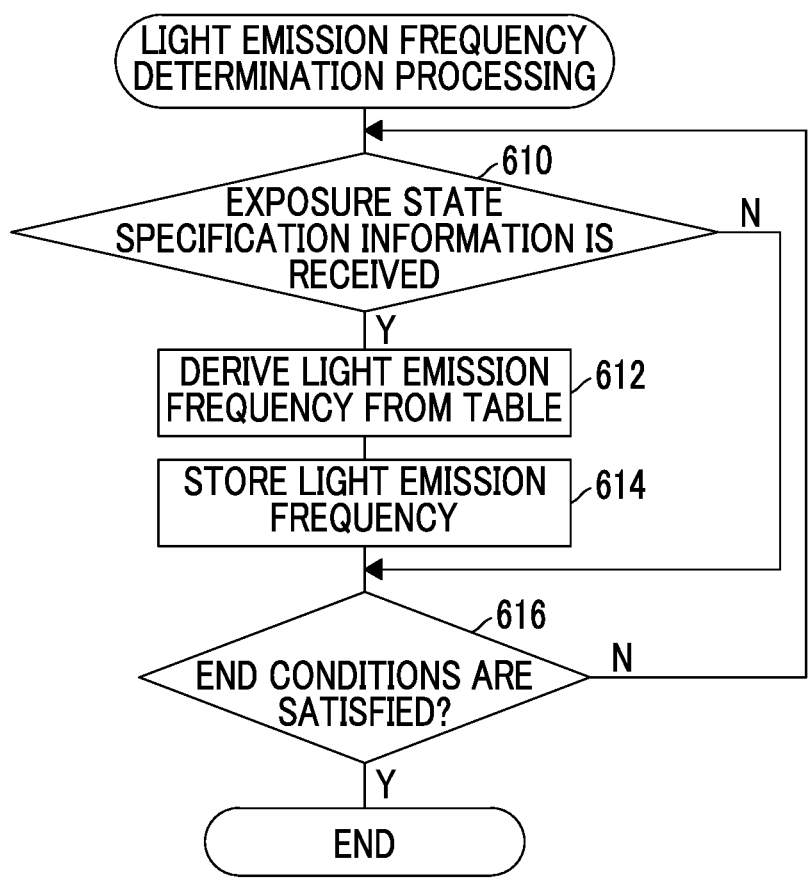
FIG. 16 is a flowchart showing another example of a flow of light emission frequency determination processing.

In the light emission frequency determination processing shown in FIG. 16, first, in Step 610, the distance measurement control unit 24 determines whether or not the exposure state specification information transmitted by executing the processing of Step 604 is received. In Step 610, in a case where the exposure state specification information transmitted by executing the processing of Step 604 is not received, the determination is negative, and the process progresses to Step 616. In Step 610, in a case where the exposure state specification information transmitted by the executing the processing of Step 604 is received, the determination is affirmative, and the process progresses to Step 612.

In Step 612, the distance measurement control unit 24 derives the light emission frequency corresponding to the exposure state specification information received in Step 610 from the light emission frequency determination table 500, and then, the process progresses to Step 614.

In Step 614, the distance measurement control unit 24 stores the light emission frequency derived in the processing of Step 612 in the storage unit 48, and then, the process progresses to Step 616. The light emission frequency stored in the storage unit 48 by the processing of Step 616 means "a predetermined number of times" in Step 218 of the distance measurement processing shown in FIG. 6B.

In Step 616, the main control unit 26 determines whether or not end conditions which are conditions for ending this exposure state specification information transmission processing are satisfied. An example of the end conditions is a condition that the power switch of the distance measurement device 10 is turned off. In Step 616, in a case where the end conditions are not satisfied, the determination is negative, and the process progresses to Step 610. In Step 616, in a case where the end conditions are satisfied, the determination is affirmative, and this exposure state specification information transmission processing ends.

In this way, since the distance measurement device 10 makes the light emission frequency (distance measurement frequency) of the laser beam larger when the subject brightness is higher, it is possible to obtain a distance measurement result, in which the influence of noise of ambient light is moderated, compared to a case where the light emission frequency (distance measurement frequency) of the laser beam is fixed regardless of the subject brightness.

In the above-described embodiment, although the laser beam has been illustrated as light for distance measurement, the technique of the present disclosure is not limited thereto, and directional light which is light having directivity may be used. For example, directional light which is obtained by a light emitting diode (LED) or a super luminescent diode (SLD) may be used. The directivity of directional light is preferably the same directivity as the directivity of the laser beam, and is preferably, for example, the directivity usable in a distance measurement within a range of several meters to several kilometers.

The disclosures of Japanese Patent Application No. 2014-095557 filed on May 2, 2014 and Japanese Patent Application No. 2014-159803 filed on Aug. 5, 2014 are incorporated by reference in this specification.

All documents, patent applications, and technical specifications described in this specification are incorporated by reference in this specification as if each of the documents, the patent applications, and the technical specification is concretely and respectively specified as being incorporated by reference herein.

In regard to the above embodiment, the following appendixes are further disclosed.

Appendix 1

A distance measurement device includes an imaging unit which captures a subject image formed by an imaging optical system forming the subject image indicating a subject, an emission unit which emits a laser beam along an optical axis direction of the imaging optical system, a light receiving unit which receives reflected light of the laser beam from the subject, a derivation unit which derives a distance to the subject based on a timing at which the laser beam is emitted by the emission unit and a timing at which the reflected light is received by the light receiving unit, and a control unit which performs control such that at least a part of an imaging period by the imaging unit overlaps at least a part of a distance measurement period by the emission unit, the light receiving unit, and the derivation unit.

Appendix 2

A distance measurement method including deriving a distance to a subject based on the timing at which directional light is emitted by an emission unit emitting directional light as light having directivity along an optical axis direction of an imaging optical system forming a subject image indicating the subject and a timing at which reflected light is received by a light receiving unit receiving the reflected light of the directional light from the subject, and performing control such that at least a part of an imaging period by an imaging unit capturing a subject image formed by the imaging optical system overlaps at least a part of a distance measurement period.

Appendix 3

A distance measurement program which causes a computer to execute processing including deriving a distance to a subject based on a timing at which directional light is emitted by an emission unit emitting directional light as light having directivity along an optical axis direction of an imaging optical system forming a subject image indicating the subject and a timing at which reflected light is received by a light receiving unit receiving the reflected light of the directional light from the subject, and performing control such that at least a part of an imaging period by an imaging unit capturing a subject image formed by the imaging optical system overlaps at least a part of a distance measurement period.

What is claimed is:

1. A distance measurement method for a digital camera comprising:
   capturing, by an imaging sensor a subject image of a subject by performing actual exposure;
   forming, by an imaging optical system, the subject image;
   emitting, by a light emitter, light;
   receiving, by a light receiver, reflected light of the light from the subject;
   performing a distance measurement operation by the light emitter and the light receiver and an imaging operation by the image sensor;
   performing the distance measurement operation in which the derivation of a distance to the subject is performed multiple times so as to derive a final distance; and
   in a case in which an erroneous measurement, in which an elapsed time from a light emission to a light reception of the light exceeds a predetermined time, or the light is not returned to be received by the light receiver, occurs predetermined times, indicating an error on a display.

2. The distance measurement method according to claim 1,
   wherein, in a case of deriving the final distance, a distance range for use or a time range from the emission of the light to the reception of the light is determined based on focusing state specification information of the digital camera and the final distance is derived within the determined distance range or the determined time range.

3. The distance measurement method according to claim 2,
   wherein, in a case of deriving the distance, the final distance is derived with a resolution determined according to a result of determination of the distance range or the time range.

4. The distance measurement method according to claim 1,
   wherein emission intensity of the light emitter is adjusted based on at least one of focusing state specification information of the digital camera or subject brightness or exposure state specification information of the digital camera to emit the light.

5. The distance measurement method according to claim 4,
   wherein the emission intensity is made lower when a focal distance indicated by the focusing state specification information of the digital camera is shorter.

6. The distance measurement method according to claim 4,
   wherein the emission intensity is made lower when the subject brightness is lower and the emission intensity is made lower when the exposure indicated by the exposure state specification information of the digital camera is higher.

7. The distance measurement method according to claim 1,
   wherein light receiving sensitivity of the light receiver is adjusted based on focusing state specification information of the digital camera to receive the reflected light.

8. The distance measurement method according to claim 7,
   wherein the light receiving sensitivity is made lower when a focal distance indicated by the focusing state specification information of the digital camera is shorter.

9. The distance measurement method according to claim 1,
   wherein a distance measurement by the light emitter and the light receiver, is performed a number of times determined in advance according to subject brightness or exposure state specification information of the digital camera.

10. The distance measurement method according to claim 9,
    wherein the distance measurement by the light emitter, and the light receiver is performed a larger number of times when the subject brightness is higher or when the exposure indicated by the exposure state specification information of the digital camera is lower.

11. The distance measurement method according to claim 1, further comprising:
    storing the distance,
    wherein the storing is stopped in a case where the derivation of the distance is impossible.

12. The distance measurement method according to claim 11, further comprising:
    setting whether or not to stop the storing in a case where the derivation of the distance is impossible.

13. The distance measurement method according to claim 1, further comprising
    receiving a first press action for adjusting a focus distance and a second press action for imaging the subject by the image sensor and the second press action is an action which an image capture button is pressed.

14. The distance measurement method according to claim 1,
    wherein drive of the light emitter or the light receiver is adjusted according to information of an exposure state of an imaging condition.

15. The distance measurement method according to claim 1,
    wherein the light emitted by the light emitter is a directional light.

16. The distance measurement method according to claim 1,
    wherein drive of the light emitter or the light receiver is adjusted according to a distance from the digital camera to the subject.

17. The distance measurement method according to claim 15,
    wherein the directional light is a laser.

18. The distance measurement method according to claim 1,
    wherein a distance having a maximum measurement frequency among the distances obtained is derived by obtaining the distance multiple times and is derived as the final distance.

19. The distance measurement method according to claim 1,
    wherein the distance measurement operation and the imaging operation is synchronized and
    wherein the light is emitted by the light emitter in a horizontal blanking period of the imaging operation.

20. The distance measurement method according to claim 1, wherein the final distance is derived based on the obtained multiple distances which are within a predetermined range.

21. The distance measurement method according to claim 20, wherein the predetermined range is based on focusing information of the image optical system.

22. The distance measurement method according to claim 1, wherein the final distance is derived based on focusing information of the image optical system.

23. The distance measurement method according to claim 1, further comprising:
performing control such that a display displays a motion image captured by the imaging sensor and displays information relating to the distance to the subject derived.

24. The distance measurement method according to claim 1,
wherein the distance is not derived in a case where there is auto focus adjustment error of the imaging optical system with respect to the subject or there is auto exposure adjustment error in a case where the imaging sensor performs imaging.

25. The distance measurement method according to claim 23,
wherein the distance is not derived in a case where there is auto focus adjustment error of the imaging optical system with respect to the subject or there is auto exposure adjustment error in a case where the imaging sensor performs imaging.

26. The distance measurement method according to claim 1, further comprising:
performing control such that the display superimposes information relating to the distance to the subject for making a user accurately ascertain a relationship between a state of the subject and the final distance.

27. The distance measurement method according to claim 23, further comprising:
storing the final distance in a storage in correlation with a captured image by the image sensor.

28. A distance measurement method for a digital camera comprising:
capturing, by an imaging sensor, a subject image of a subject by performing actual exposure;
forming, by an imaging optical system, the subject image;
emitting, by a light emitter, a light along an optical axis direction of the imaging optical system;
receiving, by a light receiver, reflected light of the light from the subject;
performing a distance measurement operation by the light emitter and the light receiver and an imaging operation by the image sensor; and
performing the distance measurement operation in which the derivation of a distance to the subject is performed multiple times so as to derive a final distance,
wherein the distance is not derived in a case where there is auto focus adjustment error of the imaging optical system with respect to the subject or there is auto exposure adjustment error in a case where the imaging sensor performs imaging.

* * * * *